(12) United States Patent
Wang et al.

(10) Patent No.: US 12,408,022 B2
(45) Date of Patent: Sep. 2, 2025

(54) TECHNIQUES FOR POLARIZATION CONVERSION FOR A BACKSCATTERING RADIO

(71) Applicant: QUALCOMM Incorporated, San Diego, CA (US)

(72) Inventors: Xiaojie Wang, Hillsborough, NJ (US); Navid Abedini, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 17/932,171

(22) Filed: Sep. 14, 2022

(65) Prior Publication Data

US 2024/0089725 A1  Mar. 14, 2024

(51) Int. Cl.
| | |
|---|---|
| *H04B 7/155* | (2006.01) |
| *H04B 7/10* | (2017.01) |
| *H04B 7/22* | (2006.01) |
| *H04W 8/22* | (2009.01) |
| *H04W 48/16* | (2009.01) |

(52) U.S. Cl.
CPC .............. *H04W 8/22* (2013.01); *H04B 7/10* (2013.01); *H04B 7/1555* (2013.01); *H04B 7/22* (2013.01); *H04W 48/16* (2013.01)

(58) Field of Classification Search
None
See application file for complete search history.

(56) References Cited

U.S. PATENT DOCUMENTS

| | | | | |
|---|---|---|---|---|
| 10,251,159 | B1* | 4/2019 | Deyle | G06F 11/1464 |
| 12,107,711 | B2* | 10/2024 | Haque | G06K 7/0008 |
| 2005/0280539 | A1* | 12/2005 | Pettus | G01S 13/9076 |
| | | | | 340/572.1 |
| 2010/0060432 | A1 | 3/2010 | Van Niekerk et al. | |
| 2012/0326844 | A1* | 12/2012 | Blaignan | G06K 19/0723 |
| | | | | 235/492 |
| 2013/0106580 | A1* | 5/2013 | Bae | H04L 1/0045 |
| | | | | 340/10.1 |
| 2013/0265140 | A1* | 10/2013 | Gudan | H04W 52/0245 |
| | | | | 340/10.3 |

(Continued)

FOREIGN PATENT DOCUMENTS

| | | |
|---|---|---|
| WO | 2021154607 A1 | 8/2021 |
| WO | 2023272442 A1 | 1/2023 |
| WO | 2023066318 A1 | 4/2023 |

OTHER PUBLICATIONS

International Search Report and Written Opinion—PCT/US2023/072549—ISA/EPO—Dec. 1, 2023.

(Continued)

*Primary Examiner* — Minh Trang T Nguyen
(74) *Attorney, Agent, or Firm* — Dalei Dong; Harrity & Harrity, LLP

(57) ABSTRACT

Various aspects of the present disclosure generally relate to wireless communication. In some aspects, a backscattering radio may transmit capability information relating to at least one of a polarization conversion capability of the backscattering radio or a backscattering modulation capability of the backscattering radio. The backscattering radio may communicate with a network node in accordance with the capability information. Numerous other aspects are described.

30 Claims, 16 Drawing Sheets

(56) References Cited

U.S. PATENT DOCUMENTS

2023/0013763 A1\* 1/2023 Jung .................... H04B 10/291
2023/0078737 A1\* 3/2023 Haque ................. G06K 7/0008
　　　　　　　　　　　　　　　　　　　　　　375/262

OTHER PUBLICATIONS

Mazaheri M.H., et al., "MMTag: A Millimeter Wave Backscatter Network", Proceedings of the ACM SIGCOMM 2021, Aug. 9, 2021, pp. 463-474, XP058619002, Section 1b Section 5.1 Figures 2, 6.

\* cited by examiner

TECHNIQUES FOR POLARIZATION CONVERSION FOR A BACKSCATTERING RADIO

FIELD OF THE DISCLOSURE

Aspects of the present disclosure generally relate to wireless communication and to techniques and apparatuses for polarization conversion for a backscattering radio.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

Some aspects described herein relate to a method of wireless communication performed by an apparatus of a backscattering radio. The method may include transmitting capability information relating to at least one of a polarization conversion capability of the backscattering radio or a backscattering modulation capability of the backscattering radio. The method may include communicating with a network node in accordance with the capability information.

Some aspects described herein relate to a method of wireless communication performed by a UE. The method may include identifying capability information, of a backscattering radio, relating to at least one of a polarization conversion capability of the backscattering radio or a backscattering modulation capability of the backscattering radio. The method may include transmitting the capability information for a network node.

Some aspects described herein relate to a method of wireless communication performed by a network node. The method may include obtaining capability information relating to at least one of a polarization conversion capability of a backscattering radio or a backscattering modulation capability of the backscattering radio. The method may include communicating with the backscattering radio in accordance with the capability information.

Some aspects described herein relate to a backscattering radio for wireless communication. The backscattering radio may include a memory and one or more processors coupled to the memory. The one or more processors may be configured to transmit capability information relating to at least one of a polarization conversion capability of the backscattering radio or a backscattering modulation capability of the backscattering radio. The one or more processors may be configured to communicate with a network node in accordance with the capability information.

Some aspects described herein relate to a UE for wireless communication. The UE may include a memory and one or more processors coupled to the memory. The one or more processors may be configured to identify capability information, of a backscattering radio, relating to at least one of a polarization conversion capability of the backscattering radio or a backscattering modulation capability of the backscattering radio. The one or more processors may be configured to transmit the capability information for a network node.

Some aspects described herein relate to a network node for wireless communication. The network node may include a memory and one or more processors coupled to the memory. The one or more processors may be configured to obtain capability information relating to at least one of a polarization conversion capability of a backscattering radio or a backscattering modulation capability of the backscattering radio. The one or more processors may be configured to communicate with the backscattering radio in accordance with the capability information.

Some aspects described herein relate to a non-transitory computer-readable medium that stores a set of instructions for wireless communication by a backscattering radio. The set of instructions, when executed by one or more processors of the backscattering radio, may cause the backscattering radio to transmit capability information relating to at least one of a polarization conversion capability of the backscattering radio or a backscattering modulation capability of the backscattering radio. The set of instructions, when executed by one or more processors of the backscattering radio, may cause the backscattering radio to communicate with a network node in accordance with the capability information.

Some aspects described herein relate to a non-transitory computer-readable medium that stores a set of instructions for wireless communication by a UE. The set of instructions, when executed by one or more processors of the UE, may cause the UE to identify capability information, of a backscattering radio, relating to at least one of a polarization conversion capability of the backscattering radio or a backscattering modulation capability of the backscattering radio. The set of instructions, when executed by one or more processors of the UE, may cause the UE to transmit the capability information for a network node.

Some aspects described herein relate to a non-transitory computer-readable medium that stores a set of instructions for wireless communication by a network node. The set of instructions, when executed by one or more processors of the network node, may cause the network node to obtain capability information relating to at least one of a polarization conversion capability of a backscattering radio or a backscattering modulation capability of the backscattering radio. The set of instructions, when executed by one or more processors of the network node, may cause the network node to communicate with the backscattering radio in accordance with the capability information.

Some aspects described herein relate to an apparatus for wireless communication. The apparatus may include means for transmitting capability information relating to at least one of a polarization conversion capability of the apparatus or a backscattering modulation capability of the apparatus. The apparatus may include means for communicating with a network node in accordance with the capability information.

Some aspects described herein relate to an apparatus for wireless communication. The apparatus may include means for identifying capability information, of a backscattering radio, relating to at least one of a polarization conversion capability of the backscattering radio or a backscattering modulation capability of the backscattering radio. The apparatus may include means for transmitting the capability information for a network node.

Some aspects described herein relate to an apparatus for wireless communication. The apparatus may include means for obtaining capability information relating to at least one of a polarization conversion capability of a backscattering radio or a backscattering modulation capability of the backscattering radio. The apparatus may include means for communicating with the backscattering radio in accordance with the capability information.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
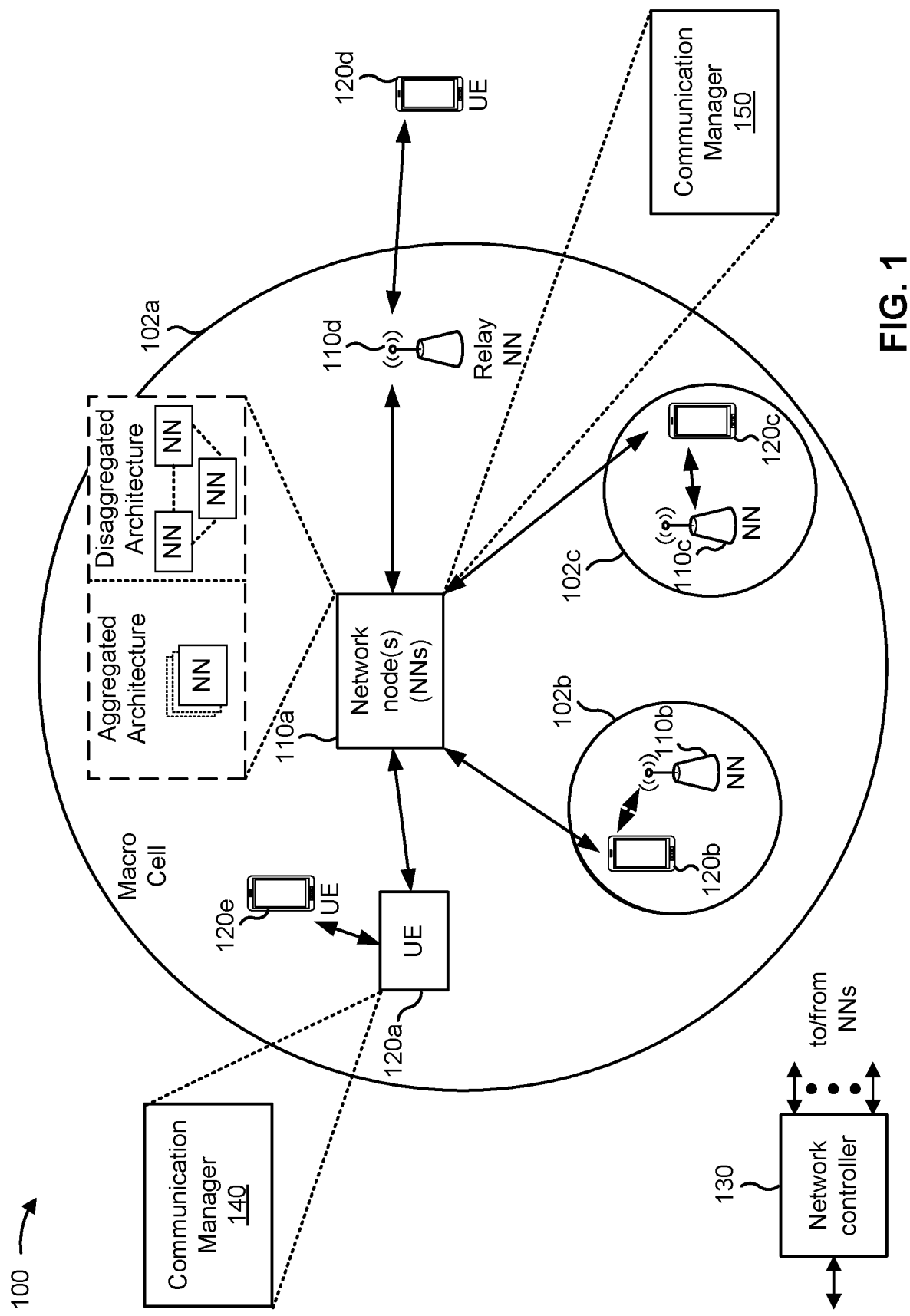
FIG. 1 is a diagram illustrating an example of a wireless network, in accordance with the present disclosure.

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node"

may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices.

Some UEs 120 may be considered a Customer Premises Equipment. A UE 120 may be included inside a housing 284 that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the backscattering radio may include a communication manager 160. As described in more detail elsewhere herein, the communication manager 160 may transmit capability information relating to at least one of a polarization conversion capability of the backscattering radio or a backscattering modulation capability of the backscattering radio; and communicate with a network node in accordance with the capability information. Additionally, or alternatively, the communication manager 160 may perform one or more other operations described herein.

In some aspects, the UE 120 may include a communication manager 140. As described in more detail elsewhere herein, the communication manager 140 may identify capability information, of a backscattering radio, relating to at least one of a polarization conversion capability of the backscattering radio or a backscattering modulation capability of the backscattering radio; and transmit the capability information for a network node. Additionally, or alternatively, the communication manager 140 may perform one or more other operations described herein.

In some aspects, the network node 110 may include a communication manager 150. As described in more detail elsewhere herein, the communication manager 150 may obtain capability information relating to at least one of a polarization conversion capability of a backscattering radio or a backscattering modulation capability of the backscattering radio; and communicate with the backscattering radio in accordance with the capability information. Additionally, or alternatively, the communication manager 150 may perform one or more other operations described herein.

As indicated above, FIG. 1 is provided as an example. Other examples may differ from what is described with regard to FIG. 1.

Figure 2:
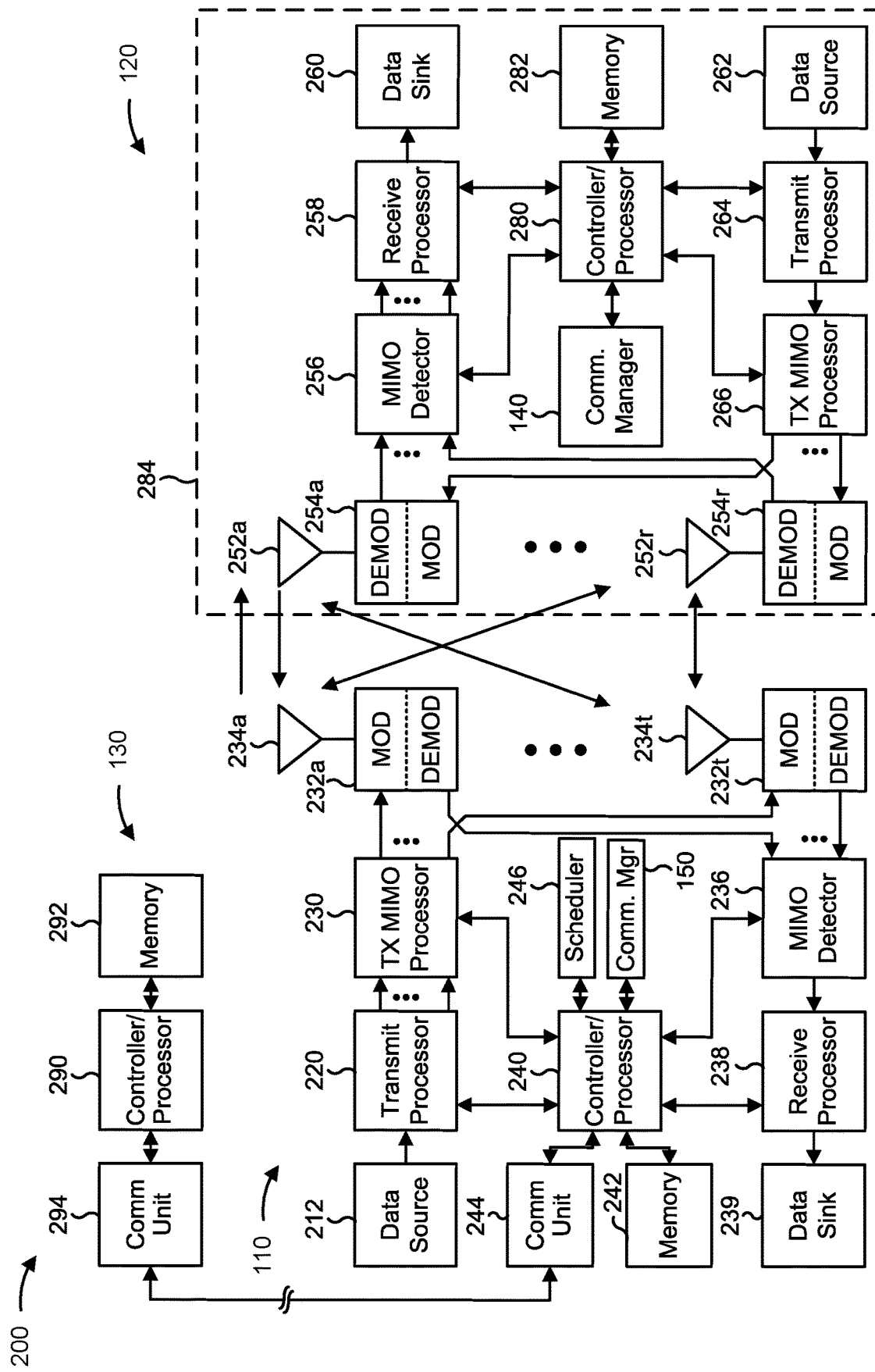
FIG. 2 is a diagram illustrating an example of a network node in communication with a user equipment (UE) in a wireless network, in accordance with the present disclosure.

FIG. 2 is a diagram illustrating an example 200 of a network node 110 in communication with a user equipment (UE) 120 in a wireless network 100. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MC S(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 4-16).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 4-16).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with capability signaling for backscattering communication, as described in more detail elsewhere herein. For example, the controller/processor 240 of the network node 110, the controller/processor 280 of the UE 120, or any other component(s) (or combinations of components) of FIG. 2 may perform or direct operations of, for example, process 1100 of FIG. 11, process 1200 of FIG. 12, process 1300 of FIG. 13, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 1100 of FIG. 11, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, a backscattering radio includes means for transmitting capability information relating to at least one of a polarization conversion capability of the backscattering radio or a backscattering modulation capability of the backscattering radio; and/or means for communicating with a network node in accordance with the capability information. In some aspects, the means for the backscattering radio to perform operations described herein may include, for example, one or more components illustrated in FIGS. 4-8.

In some aspects, a UE (e.g., UE 120) includes means for identifying capability information, of a backscattering radio, relating to at least one of a polarization conversion capability of the backscattering radio or a backscattering modulation capability of the backscattering radio; and/or means for transmitting the capability information for a network node. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., network node 110) includes means for obtaining capability information relating to at least one of a polarization conversion capability of a backscattering radio or a backscattering modulation capability of the backscattering radio; and/or means for communicating with the backscattering radio in accordance with the capability information. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
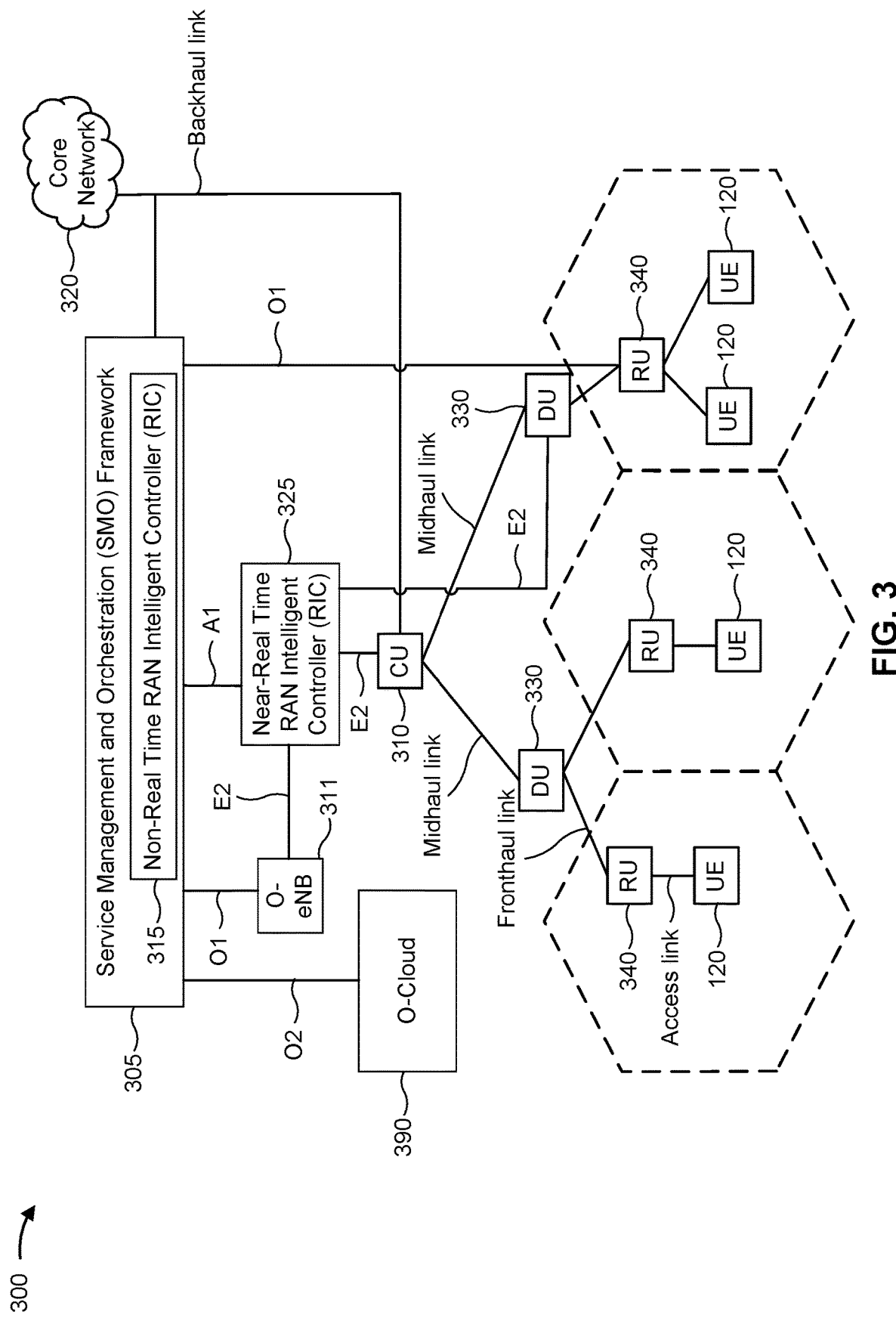
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT MC 315 may receive parameters or external enrichment information from external servers. Such information may be utilized by the Near-RT MC 325 and may be received at the SMO Framework 305 or the Non-RT MC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
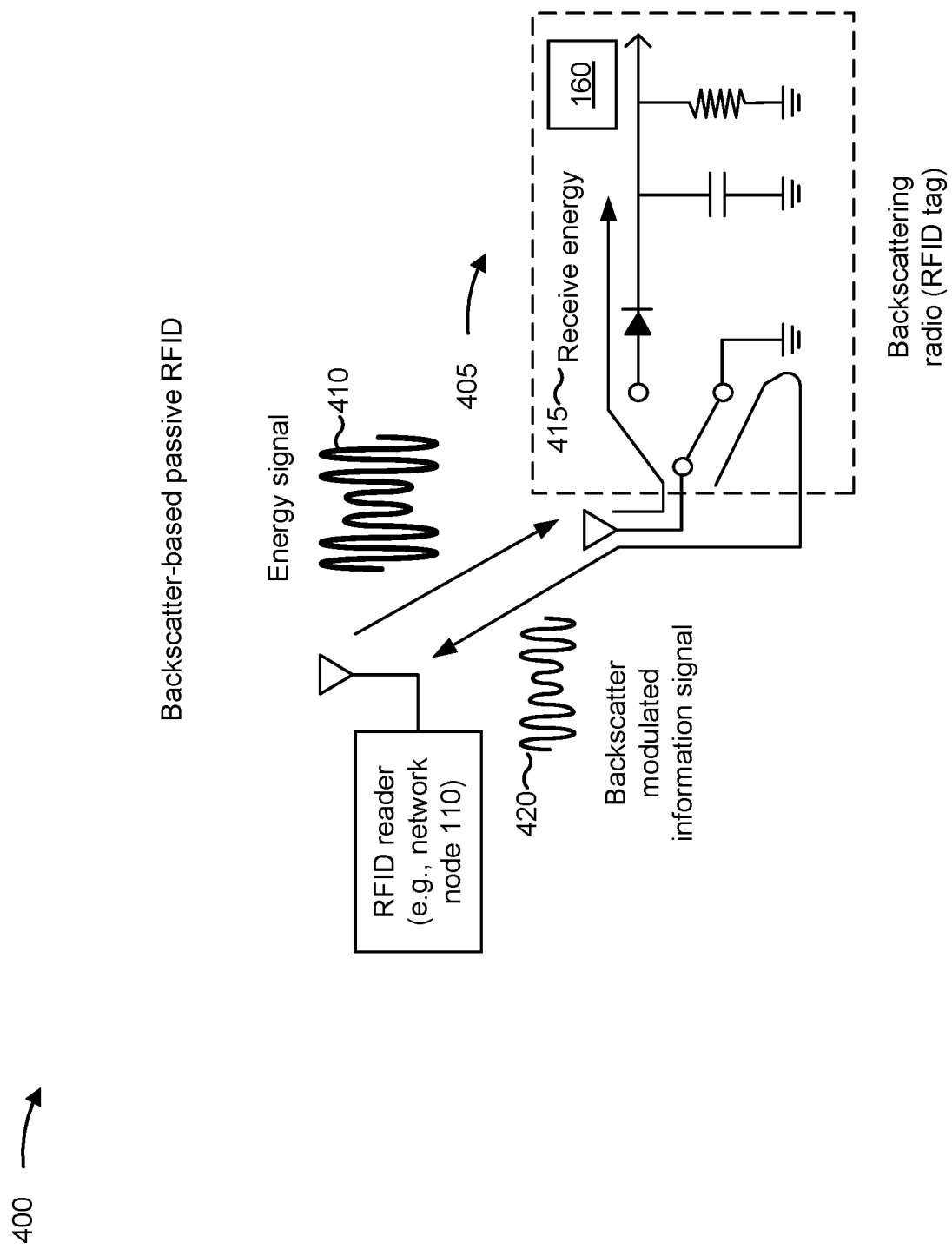
FIG. 4 is a diagram illustrating an example of a communication system including a backscattering radio and a network node, in accordance with the present disclosure.

FIG. 4 is a diagram illustrating an example 400 of a communication system including a backscattering radio 405 (e.g., a radio frequency identifier (RFID) tag) and a network node 110 (e.g., an RFID reader), in accordance with the present disclosure. RFID is a rapidly growing technology impacting many industries due to its economic potential for inventory and asset management inside and outside the warehouse, IoT, sustainable sensor networks in factories and/or agriculture, and smart home applications. An RFID system may use small transponders, sometimes referred to as RFID tags. An RFID tag is an example of a backscattering radio. An RFID tag may emit an information-bearing signal upon receiving a signal. An RFID system can be operated without a battery at low operating expense, low maintenance cost, and a long lifecycle. A backscattering radio may include a processor (e.g., a controller/processor) and a memory. In some aspects, the memory may store instructions that, when executed by the processor, cause the backscattering radio to perform one or more operations described herein, for example, with regard to FIGS. 9-11.

In some examples, a passive backscattering radio, such as a passive RFID tag, can harvest energy radiated over the air and can power the transmission/reception circuitry of the backscattering radio, where the transmitted signal is typically backscatter modulated. A backscatter modulated signal may be referred to herein as, or may carry, a backscattering communication. In some examples, a semi-passive backscattering radio (such as a semi-passive RFID tag) or an active backscattering radio (such as an active RFID tag) with a battery may be deployed, as described in more detail elsewhere herein.

As shown by reference number 410, the network node 110 (e.g., an RFID reader associated with the network node 110) may transmit a signal. As shown by reference number 415, in some aspects, the backscattering radio 405 may receive the signal without performing backscattering. For example, the backscattering radio 405 may receive energy of the signal using a transceiver, a transponder, a reception circuitry, or the like. As shown by reference number 420, in some aspects, the backscattering radio 405 may transmit a signal using energy harvested from the signal transmitted by the network node 110. For example, the backscattering radio 405 may modulate information onto the signal, and may backscatter (e.g., reflect, re-transmit) the modulated signal.

One application for a backscattering radio 405 is passive IoT. As 5G expands to an increasing number of industrial applications besides eMBB (e.g., ultra-reliable low-latency communication (URLLC) and machine-type communication (MTC), 5G and later radio access technologies may be expanded to support passive IoT. Some standards development organizations (SDOs), such as 3GPP, have developed specifications to support MTC, narrowband (NB) IoT, and reduced capability (RedCap) for MTC use cases. However, legacy 5G technology may experience difficulty efficiently supporting the most pervasive RFID-type of sensors (such as passive IoT devices) in many future use cases, such as asset management, logistics, warehousing and manufacturing.

A network node 110, such as a gNB or a node of a disaggregated gNB, may read and write information stored on a passive IoT device, such as a backscattering radio 405. The network node 110 may provide energy to the passive IoT devices via signal transmission, as described above. The backscattering radio 405 may reflect an information-bearing signal to the network node 110, referred to herein as a backscattered communication, as described above. The network node 110 may read the reflected signal to decode the information modulated onto the information-bearing signal by the IoT device. As used herein, "backscattering" refers to the reflection or deflection of a signal or wave back to a direction from which the signal or wave was received. In some aspects, backscattering may include reflecting or deflecting a signal or wave to a direction other than a direction from which the signal or wave was received.

As mentioned above, a backscattering radio 405 may harvest energy from a signal transmitted, for example, by a network node 110 (among other devices). This may be referred to as radio frequency (RF) power harvesting. The energy harvesting may be non-linear relative to an input power at the power harvesting circuitry (due to diodes). Typically, the input power may be expected to be larger than −20 dBm (in some examples, larger than −10 dBm) to activate the energy harvesting circuitry (due to an activation voltage of the diodes). Energy harvesting may be more efficient at lower frequencies due to diode junction capacitance and resistance (which may be considered frequency-selective conversion efficiency). In some examples, RFID may support short range (e.g., less than 10 meters) for passive IoT due to link budget issues. For example, The power link (that is, the downlink from the reader to the tag, which provides energy for the backscattering radio 405) may limit the range of the RFID tag. For example, the power harvesting circuitry may typically require an input power (e.g., −13 dBm) that is difficult to achieve over the downlink, since lower input power (e.g., −20 dBm or below) may not ensure satisfactory cost and conversion efficiency. Reflections by multi-path can also cause fading to the energy signal and can degrade the range.

As indicated above, FIG. 4 is provided as an example. Other examples may differ from what is described with regard to FIG. 4.

Figure 5:
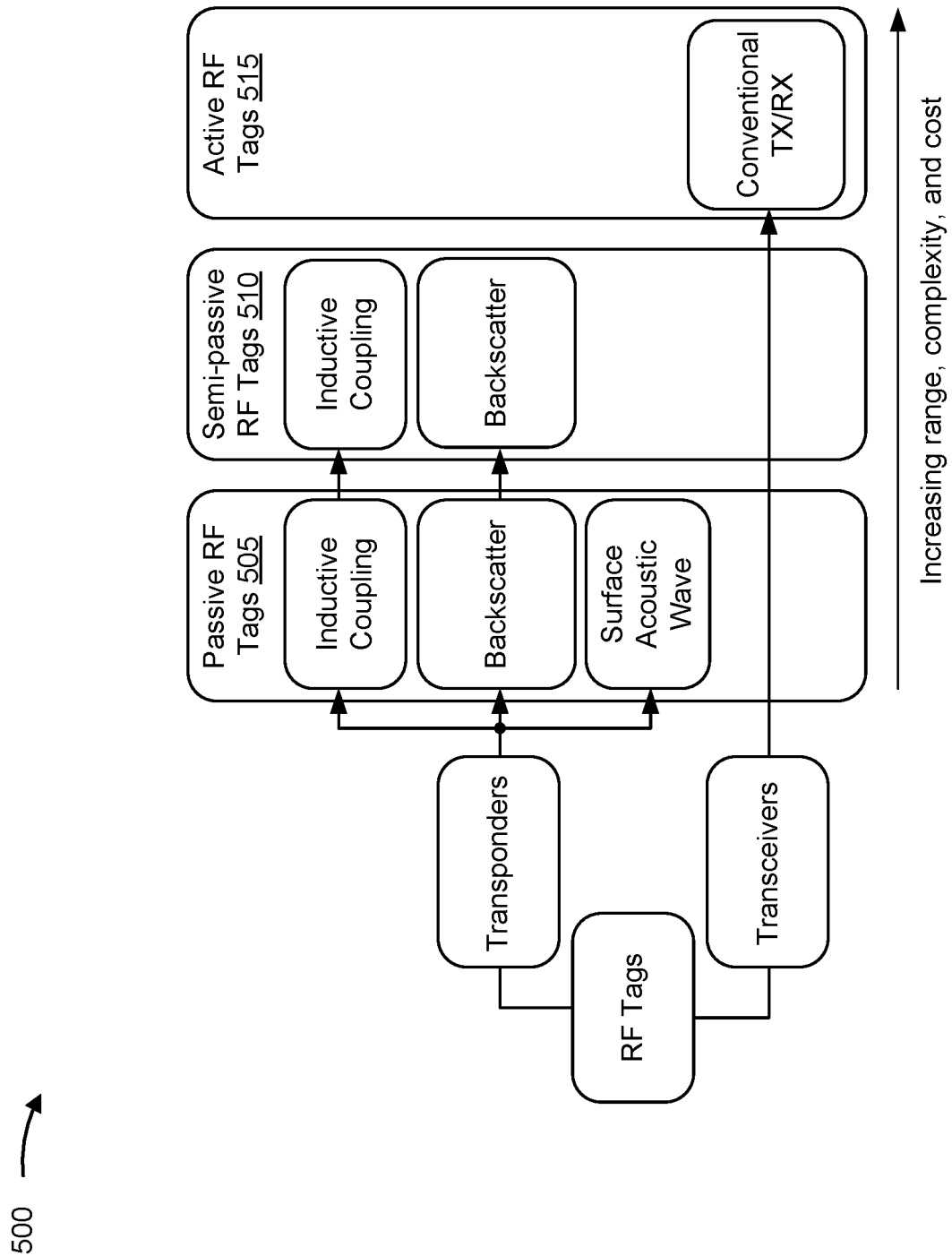
FIG. 5 is a diagram illustrating examples of categories of radio frequency (RF) tags, in accordance with the present disclosure.

FIG. 5 is a diagram illustrating examples of categories radio frequency (RF) tags, in accordance with the present disclosure. FIG. 5 illustrates a first category (shown by reference number 505) of passive RF tags, a second category (shown by reference number 510) of semi-passive RF tags, and a third category (shown by reference number 515) of active RF tags.

As shown, a passive RF tag may include a transponder. For example, a passive RF tag may include an inductive coupling transponder, a backscattering transponder, or a surface acoustic wave (SAW) filter based transponder. A passive RF tag may not include a power source. For example, a passive RF tag may collect energy via energy harvesting, as described with regard to FIG. 4.

As further shown, a semi-passive RF tag may include a transponder. A semi-passive RF tag may include a power source (such as a battery), and may communicate via backscattered communication. For example, the transponder of a semi-passive RF tag may include an inductive coupling transponder or a backscattering transponder.

As shown, an active RF tag may include a transceiver. An active RF tag may also include a power source (e.g., a battery). An active RF tag may generally have a larger communication range than a passive RF tag or a semi-passive RF tag, and may have higher complexity and energy cost than a passive or semi-passive RF tags. As used herein, "backscattering radio" may refer to a passive RF tag or a semi-passive RF tag.

As indicated above, FIG. 5 is provided as an example. Other examples may differ from what is described with regard to FIG. 5.

Figure 6:
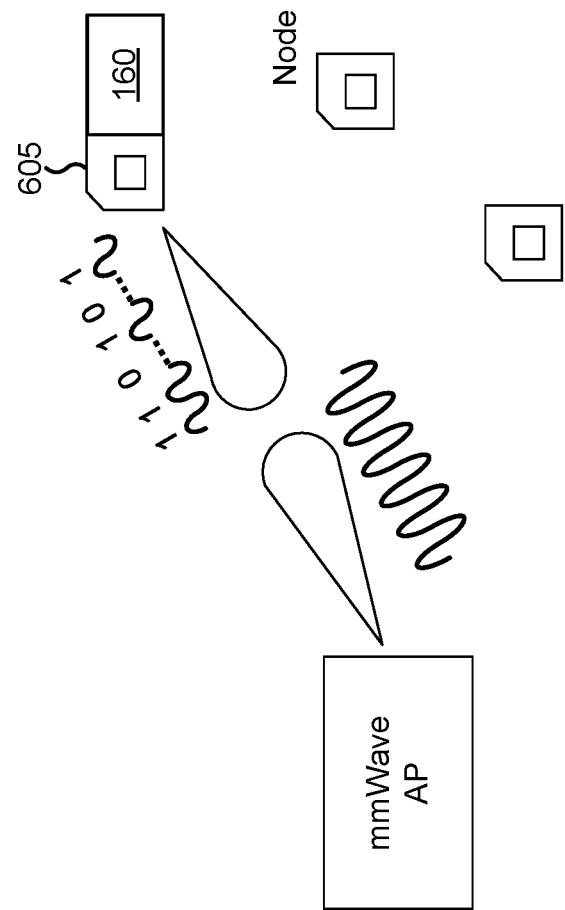
FIG. 6 is a diagram illustrating an example of backscattering communication between a network node and a backscattering radio, in accordance with the present disclosure.

FIG. 6 is a diagram illustrating an example 600 of backscattering communication between a network node 110 (e.g., a mmWave access point (AP)) and a backscattering radio 605, in accordance with the present disclosure.

In some example, backscattering in the mmWave range may enable high throughput and long-range backscatter-based communication. For example, an RFID reader capable of mmWave communication (e.g., a network node 110) may transmit a beamformed continuous wave (CW) signal to an RFID tag capable of mmWave communication. The RFID tag may either absorb or backscatter the signal (such as using on-off keying (OOK)), or may apply amplitudes and phase shifts to the CW to modulate data symbols (e.g., quadrature amplitude modulation (QAM) symbols) onto the backscattered signal. A passive beamforming network (BFN) may be used for low-power consumptions (which may be referred to as a Van Atta retro-direction BFN).

The mmWave reader (e.g., the network node 110) may suffer from full-duplex interference when transmitting the CW signal and decoding the backscattered signal from the RFID tag. For example, the network node 110 may transmit a CW signal and receive the backscattered signal using the same spatial resources (e.g., the same beam). Full-duplex processing in the mmWave range (such as to eliminate interference between the CW signal and the reflected signal) is complex and expensive. Some techniques described herein provide polarization conversion at an RFID tag when backscattering (e.g., reflecting) a signal (e.g., a CW signal) to a network node 110, as described in more detail in connection with FIG. 9.

As indicated above, FIG. 6 is provided as an example. Other examples may differ from what is described with regard to FIG. 6.

Figure 7:
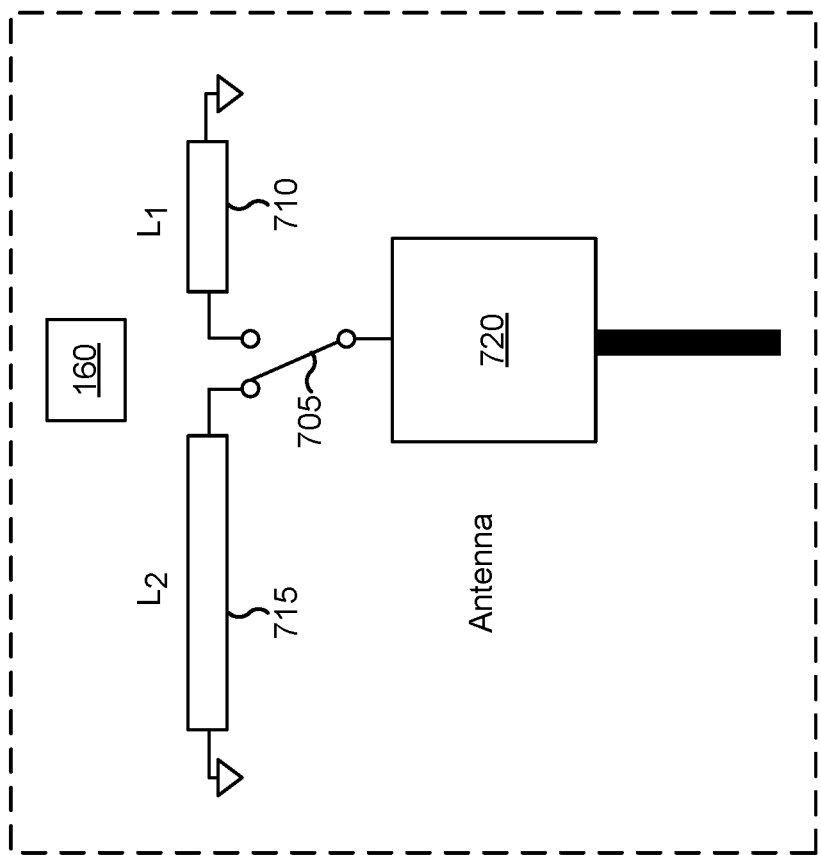
FIG. 7 is a diagram illustrating an example of induction states for a backscattering radio, in accordance with the present disclosure.

FIG. 7 is a diagram illustrating an example 700 of induction states for a backscattering radio, in accordance with the present disclosure. A backscattering radio may support modulation of information onto a backscattered (e.g., reflected) signal. For example, an RF switch 705 may be used to switch between different impedances. For example, the RF switch 705 may switch the backscattering radio between a first impedance 710 and a second impedance 715 to manipulate the amplitude and/or phase of the backscattered signal. The backscattering radio may use a variety of modulation schemes (e.g., OOK, amplitude shift keying (ASK), phase shift keying (PSK), quadrature amplitude modulation (QAM), or the like), depending on the number of different impedances achievable by the backscattering radio. The RF switch 705 may connect an antenna 720 of the backscattering radio to a set of components providing a particular impedance state depending on the phase and/or amplitude characteristics to be imparted to the backscattered signal (e.g., depending on the information to be sent via the antenna). In some examples, such as in FR1, a backscattering radio using mmWave may support ASK or OOK using one or more single pole double throw (SPDT) switches, which may provide a lower-cost solution for phase manipulation than the RF switch 705 (though the RF switch 705 may also facilitate amplitude manipulation).

As indicated above, FIG. 7 is provided as an example. Other examples may differ from what is described with regard to FIG. 7.

Figure 8:
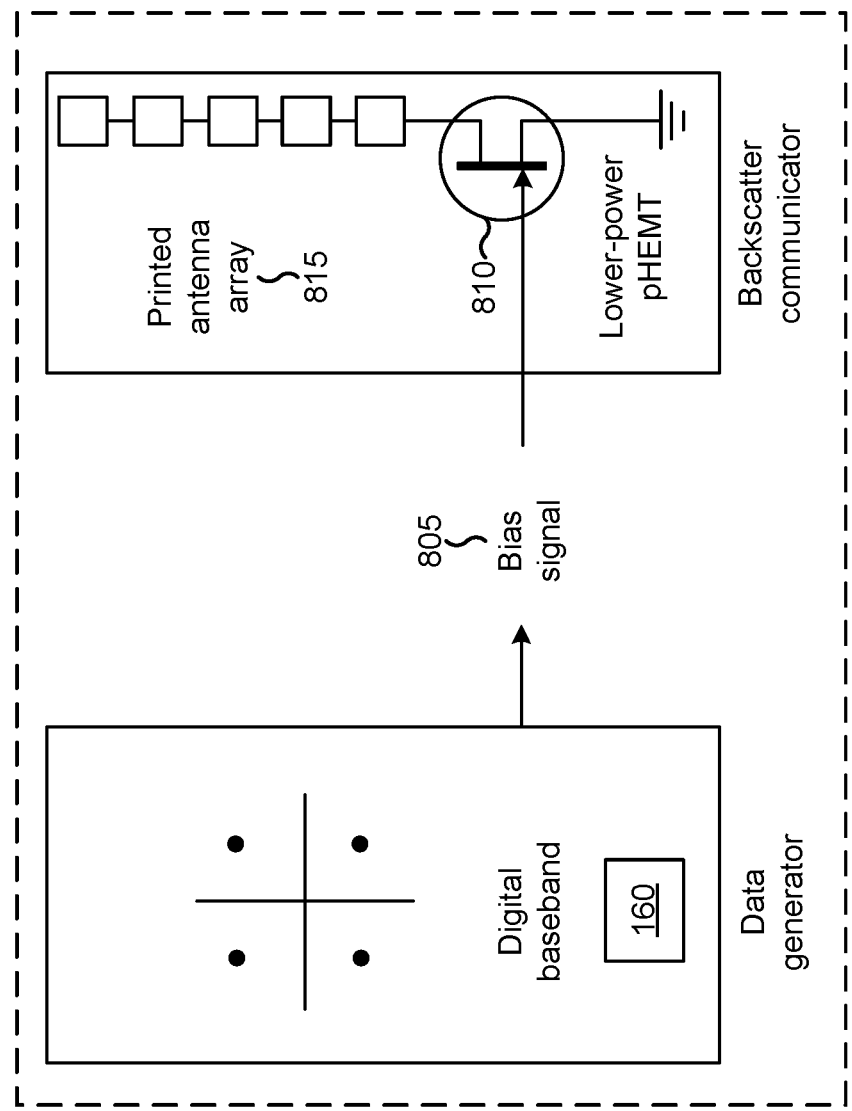
FIG. 8 is a diagram illustrating an example of a backscattering radio, in accordance with the present disclosure.

FIG. 8 is a diagram illustrating an example of a backscattering radio 800, in accordance with the present disclosure. The backscattering radio 800 may support PSK or QAM. The backscattering radio 800 may generate a bias signal 805. The bias signal 805 may control a transistor 810, which is illustrated as a pseudomorphic high electron mobility transistor (pHEMT). Depending on the bias signal 805, an antenna array 815 of the backscattering radio 800 may be tuned by the transistor 810 to radiate a backscattering signal with controllable amplitude and phase. Thus, a backscattering radio 800 can implement PSK or QAM modulation schemes. The backscattering radio 800 may include a data generator, which may comprise a processor (e.g., a controller/processor), a digital baseband component, a communication manager 160, or the like. Capabilities for modulation of backscattered signals may vary from backscattering radio to backscattering radio. For example, some backscattering radios may be capable of implementing more complex modulation schemes (e.g., PSK, QAM, such as using a transistor 810 or an RF switch 705 with a large number of impedance states), whereas other backscattering radios may only be capable of implementing less complex modulation schemes (such as using one or more SPDT switches or an RF switch 705 with a small number of impedance states). If a network node 110 cannot determine the modulation scheme supported by a given backscattering radio, complexity of decoding the backscattered communication may increase and the network node may be unable to predict data rates between the network node 110 and the backscattering radio. For example, the network node 110 may assume a less complex modulation scheme than the backscattering radio is capable of, which decreases throughput and efficiency of resource utilization, and which may lead to failure to decode a backscattered communication. As another example, the network node 110 may assume a more complex modulation scheme than which the backscattering radio is capable, which leads to failure to decode communications between the network node 110 and the backscattering radio. Some techniques described herein define signaling between the network node 110 and the backscattering radio for to support modulation of backscattered communications. For example, the network node 110 may announce that the network node 110 can receive signals using one or more modulation schemes, or may request capability information from the backscattering radio indicating one or more modulation schemes supported by the backscattering radio. Additionally, or alternatively, the backscattering radio may report (such as via a UE 120) that the backscattering radio supports one or more modulation schemes. Thus, efficiency of resource utilization and throughput are increased, and the occurrence of failure to decode backscattered communications is reduced.

As indicated above, FIG. 8 is provided as an example. Other examples may differ from what is described with regard to FIG. 8.

Figure 9:
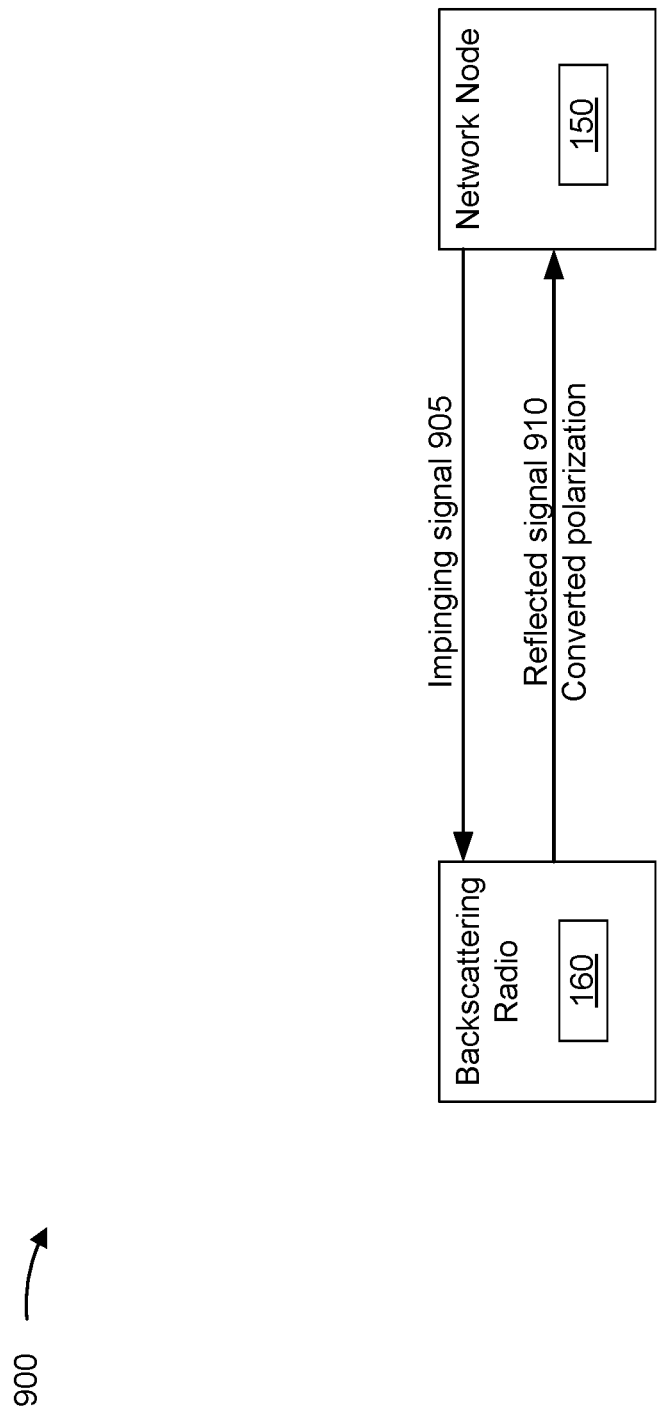
FIG. 9 is a diagram illustrating an example of polarization conversion for a backscattering radio, in accordance with the present disclosure.

FIG. 9 is a diagram illustrating an example 900 of polarization conversion for a backscattering radio, in accordance with the present disclosure. As shown, the backscattering radio may receive a signal 905 from a network node 110 (e.g., an RFID reader). As further shown, the backscattering radio may backscatter (e.g., reflect) the signal 905 as a signal 910 with a converted polarization. For example, the signal 910 may have a polarization that is orthogonal to a polarization of the signal 905.

In some aspects, the signal 905 may have a linear polarization (e.g., comprising either an x-component or a y-component). In such examples, the polarization of the signal 910 may be rotated 90 degrees relative to the polarization of the signal 905.

In some aspects, the signal 905 may have a circular polarization (e.g., comprising an x-component and a y-component). In such examples, the backscattering radio may exchange the x-component and the y-component, and may rotate the x-component by 180 degrees to achieve orthogonality between the signal 905 and the signal 910.

In some aspects, an antenna of the backscattering radio may be connected to a polarization conversion circuitry. The polarization conversion circuitry may convert the polarization of the signal 905 so that impinging signal 905 and the backscattered signal 910 have orthogonal polarizations. Thus, the network node 110 can isolate the signal 905 from the signal 910 through polarization, thereby reducing the complexity of decoding backscattering signal.

Some backscattering radios may not have a capability for polarization conversion, while other backscattering radios may have the capability for polarization conversion. For example, a backscattering radio may, or may not, incorporate polarization conversion circuitry. If a network node 110 cannot determine whether a given backscattering radio can perform polarization conversion for a backscattered communication, complexity of decoding the backscattered communication may increase. For example, the network node 110 may need to perform interference cancellation between the signal 905 and the signal 910, thereby increasing complexity. As another example, the network node 110 may use multiple hypotheses to decode information of the signal 910, such as a first hypothesis with no polarization conversion and a second hypothesis using polarization conversion. Some techniques described herein define signaling between the network node 110 and the backscattering radio for reporting whether the backscattering radio supports polarization conversion. For example, the network node 110 may announce that the network node 110 can receive signals using polarization conversion. Additionally, or alternatively, the backscattering radio may report (such as via a UE 120) that the backscattering radio supports polarization conversion for backscattered communications. Thus, complexity at the network node 110 is reduced.

As indicated above, FIG. 9 is provided as an example. Other examples may differ from what is described with regard to FIG. 9.

Figure 10:
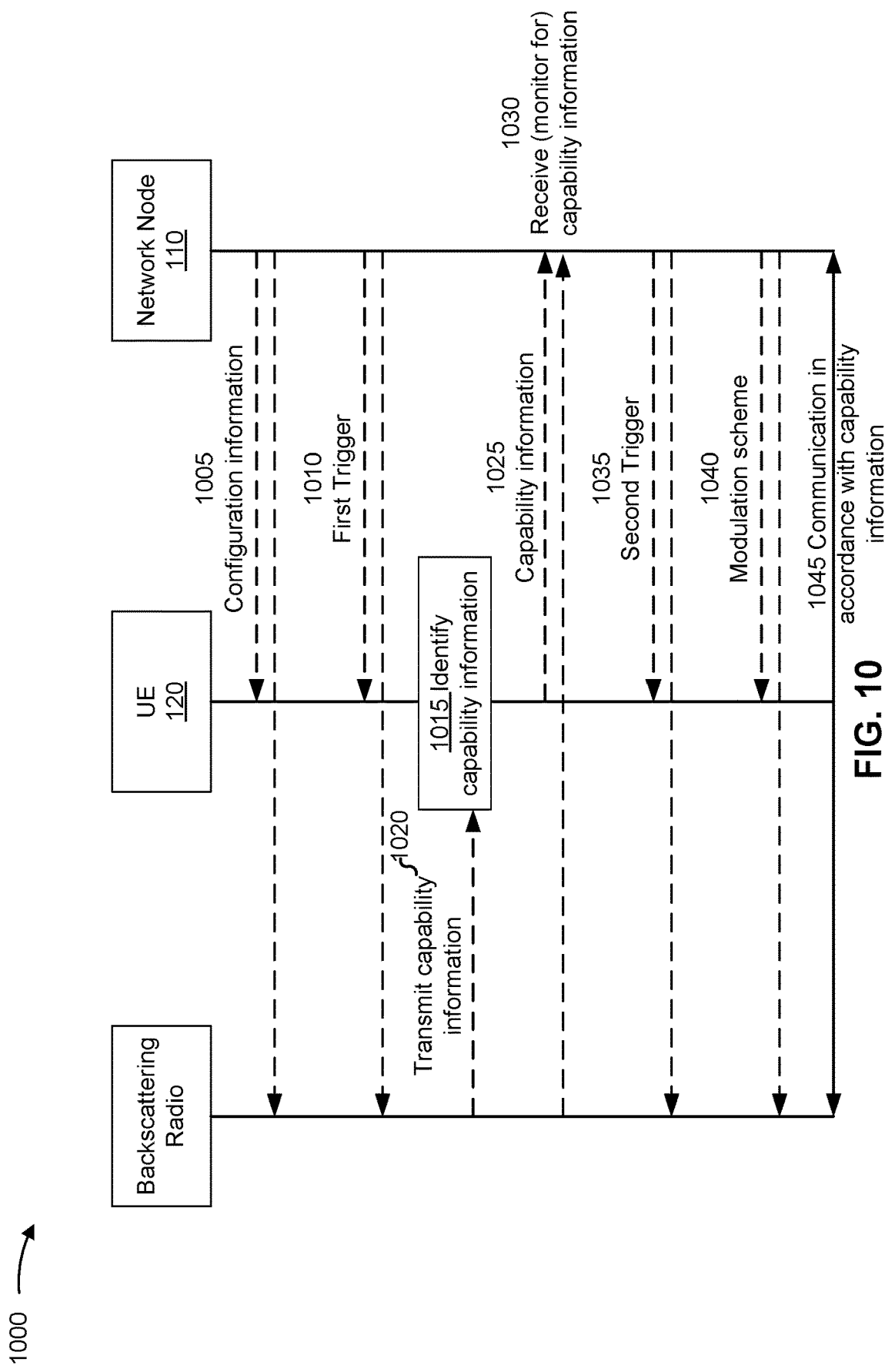
FIG. 10 is a diagram illustrating an example of capability signaling associated with polarization conversion or backscattered communication modulation, in accordance with the present disclosure.

FIG. 10 is a diagram illustrating an example 1000 of capability signaling associated with polarization conversion or backscattered communication modulation, in accordance with the present disclosure. As shown, example 1000 includes a UE 120, a backscattering radio, and a network node 110. In some aspects, the network node 110 may include or be associated with (e.g., may control, may communicate with) a reader, such as an RFID reader. In some aspects, the backscattering radio may include an RFID tag (e.g., a passive tag, a semi-passive tag, or an active tag). In some aspects, the backscattering radio may be a component of the UE 120. In some other aspects, the backscattering radio may be separate from the UE 120. If the backscattering radio is a component of the UE 120, the backscattering radio may communicate with the UE 120 via an interface with the UE 120 (e.g., a wired interface), and "transmission" by the backscattering radio may refer to communications via the interface. If the backscattering radio is separate from the UE 120, the backscattering radio and the UE 120 may communicate over the air.

As shown by reference number 1005, in some aspects, the network node 110 may output configuration information. For example, the network node 110 may output the configuration information via radio resource control (RRC) signaling, medium access control (MAC) signaling, downlink control information (DCI), or another form of signaling. In some aspects, the configuration information may indicate whether capability information (e.g., capability information indicating capabilities of the backscattering radio) is to include a polarization conversion capability or a backscattering modulation capability. A polarization conversion capability is information indicating whether the backscattering radio has a capability to perform polarization conversion for a backscattered communication. A backscattering modulation capability is information indicating one or more capabilities for modulation of information onto a backscattered signal, such as information indicating one or more modulation schemes supported by the backscattered radio and/or information indicating whether the backscattering radio is capable of modulating information onto a backscattered signal.

In some aspects, the configuration information may indicate a modulation scheme (e.g., a modulation format) for the capability information. For example, the configuration information may indicate a modulation scheme in which the UE 120 (or the backscattering radio) is to transmit the capability information. In some aspects, the modulation scheme may be selected from a group of modulation schemes. For example, the modulation scheme may be one of a set of mandatory modulation schemes for the capability information. In some aspects, the configuration information may indicate whether polarization conversion is allowed for the capability information. For example, the configuration information may indicate whether the backscattering radio can provide the capability information via a backscattered communication that is polarization converted relative to an impinging signal at the backscattering radio. In some aspects, if the network node 110 indicates (via the configuration information) that the network node 110 allows polarization conversion for the capability information, the network node 110 may monitor for the capability information using multiple hypotheses. For example, the multiple hypotheses may include a first hypothesis for which polarization conversion is used for the capability information and a second hypothesis in which polarization conversion is not used for the capability information. In some aspects, if the network node 110 indicates (via the configuration information) that the network node 110 does not allow polarization conversion for the capability information, the network node 110 may monitor for the capability information using a single hypothesis (e.g., for which polarization conversion is disabled).

In some aspects, the configuration information (or other signaling) may indicate a modulation scheme supported by the network node 110. In one example, the configuration information may indicate that the network node 110 supports OOK only. In some aspects, the configuration information may indicate whether the network node 110 supports polarization conversion. In some aspects, the configuration information may indicate whether the network node 110 supports polarization conversion and one or more modulation schemes supported by the network node 110. For example, the configuration information may indicate a category, and the category may indicate whether the network node 110 supports polarization and one or more modulation schemes supported by the network node 110.

In some aspects, the configuration information may indicate that a connection with a backscattering radio is barred. For example, the configuration information may indicate that a backscattering radio that lacks a particular capability (e.g., a polarization conversion capability) is barred from connecting to the network node 110. As another example, the configuration information may indicate that backscattering radios belonging to a particular category (indicating a polarization conversion capability and/or a backscattering modulation capability, as described below) are barred from connecting to the network node 110. As used herein, "connecting to the network node 110" may refer to performing backscattered communication with the network node 110.

As shown by reference number 1010, in some aspects, the UE 120 or the backscattering radio may receive a first trigger. For example, the network node 110 may output the first trigger, such as via RRC signaling, MAC signaling, DCI, or another form of signaling. In some aspects, the first trigger may indicate to transmit the capability information. For example, the first trigger may be a trigger for transmitting the capability information shown by reference number 1025.

As shown by reference number 1015, the UE 120 may identify capability information. Additionally, or alternatively, as shown by reference number 1020, the backscattering radio may transmit the capability information. For example, the backscattering radio may provide the capability information to the UE 120 (e.g., prior to the trigger or in association with the trigger). As another example, the backscattering radio may transmit the capability information to the network node 110 (e.g., an RFID reader of the network node 110). In some aspects, the UE 120 may identify the capability information in association with the trigger. For example, the UE 120 may obtain the capability information from the backscattering radio in response to receiving the trigger. In some aspects, the UE 120 may store the capability information prior to receiving the trigger. For example, the UE 120 may be pre-configured with the capability information, or may obtain the capability information from the backscattering radio upon connecting to the backscattering radio.

The capability information may include at least one of a polarization conversion capability or a backscattering modulation capability. For example, the capability information may indicate whether the backscattering radio is capable of modulating information onto a backscattered signal. Additionally, or alternatively, the capability information may indicate one or more modulation schemes for a backscattered communication supported by the backscattering radio (e.g., ASK only, PSK only, QAM, OOK only, etc.). In some aspects, the capability information may indicate a category. The category may identify (or may be used to identify) the polarization conversion capability and/or the backscattering modulation capability. For example, a first category may indicate that the backscattering radio does not support polarization conversion and is only capable of OOK modulation. A second category may indicate that the backscattering radio supports polarization conversion and is only capable of OOK modulation. A third category may indicate that the backscattering radio supports polarization conversion and is capable of QAM modulation. In some aspects, the capability information may indicate multiple modulation schemes supported by the backscattering radio. In some aspects, the capability information may indicate that the backscattering radio is capable of activating or deactivating (e.g., switching on or off) polarization conversion.

In some aspects, the backscattering radio or the UE 120 may not respond to a trigger to provide capability information. For example, the backscattering radio or the UE 120 may not respond to a first trigger based at least in part on the network node 110 not supporting a modulation scheme supported by the backscattering radio. For example, if the backscattering radio communicates using QAM, and the network node 110 does not support QAM (for example, as indicated by the configuration information), the backscattering radio or the UE 120 may not respond to the network node 110. Thus, air interface resources are conserved.

As shown by reference number 1025, the UE 120 and/or the backscattering radio may transmit the capability information to the network node 110. For example, the UE 120 and/or the backscattering radio may transmit the capability information in connection with receiving the first trigger (e.g., in response to a first trigger). In some aspects, the UE 120 and/or the backscattering radio may transmit the capability information using polarization conversion (e.g., based at least in part on the configuration information indicating that the network node 110 supports polarization conversion). For example, the backscattering radio may enable polarization conversion based at least in part on the network node 110 allowing polarization conversion for the capability information.

As shown by reference number 1030, the network node 110 may receive the capability information. For example, the network node 110 may monitor for the capability information, as described elsewhere herein. In some aspects, the network node 110 may monitor for the capability information using a basic capability (such as assuming no polarization, and assuming a relatively simple modulation scheme such as OOK or PSK as compared to QAM). After receiving the capability information, the network node 110 may communicate with the backscattering radio using a modulation scheme supported by the backscattering radio in accordance with the capability information. Additionally, or alternatively, the network node 110 may activate or deactivate (e.g., not use) polarization conversion for in accordance with the capability information. In some aspects, as shown by reference number 1035, the network node 110 may transmit a second trigger. For example, the second trigger may indicate to activate polarization conversion at the backscattering radio. The backscattering radio and/or the UE 120 may activate polarization conversion in connection with receiving the second trigger. In some aspects, as shown by reference number 1040, the network node 110 may transmit information indicating a modulation scheme. For example, the network node 110 may transmit information indicating a modulation scheme for subsequent data communication between the network node 110 and the backscattering radio. The modulation scheme may be selected from one or more modulation schemes indicated by the capability information as supported by the backscattering radio. As shown by reference number 1045, the backscattering radio and the network node 110 may communicate in accordance with the capability information. For example, the backscattering radio may transmit, and the network node may receive, a backscattered transmission (e.g., by backscattering a signal of the network node 110). As another example, the network node 110 may schedule a backscattered transmission from the backscattered radio. The backscattered transmission may use a modulation scheme indicated by the capability information and/or the information shown by reference number 1040. The backscattering transmission may, in some aspects, use polarization conversion (e.g., depending on if the backscattering radio and the network node 110 support polarization conversion).

In some aspects, downlink communications of FIG. 10 (e.g., the first trigger, the second trigger, the configuration information, the information indicating the modulation scheme) may be transmitted from the network node 110 to the UE 120. The UE 120 may then transmit the downlink communications to the backscattering radio (e.g., via an interface or over the air). In some aspects, downlink communications of FIG. 10 (e.g., the first trigger, the second trigger, the configuration information, the information indicating the modulation scheme) may be transmitted from the network node 110 directly to the backscattering radio.

As indicated above, FIG. 10 is provided as an example. Other examples may differ from what is described with regard to FIG. 10.

Figure 11:
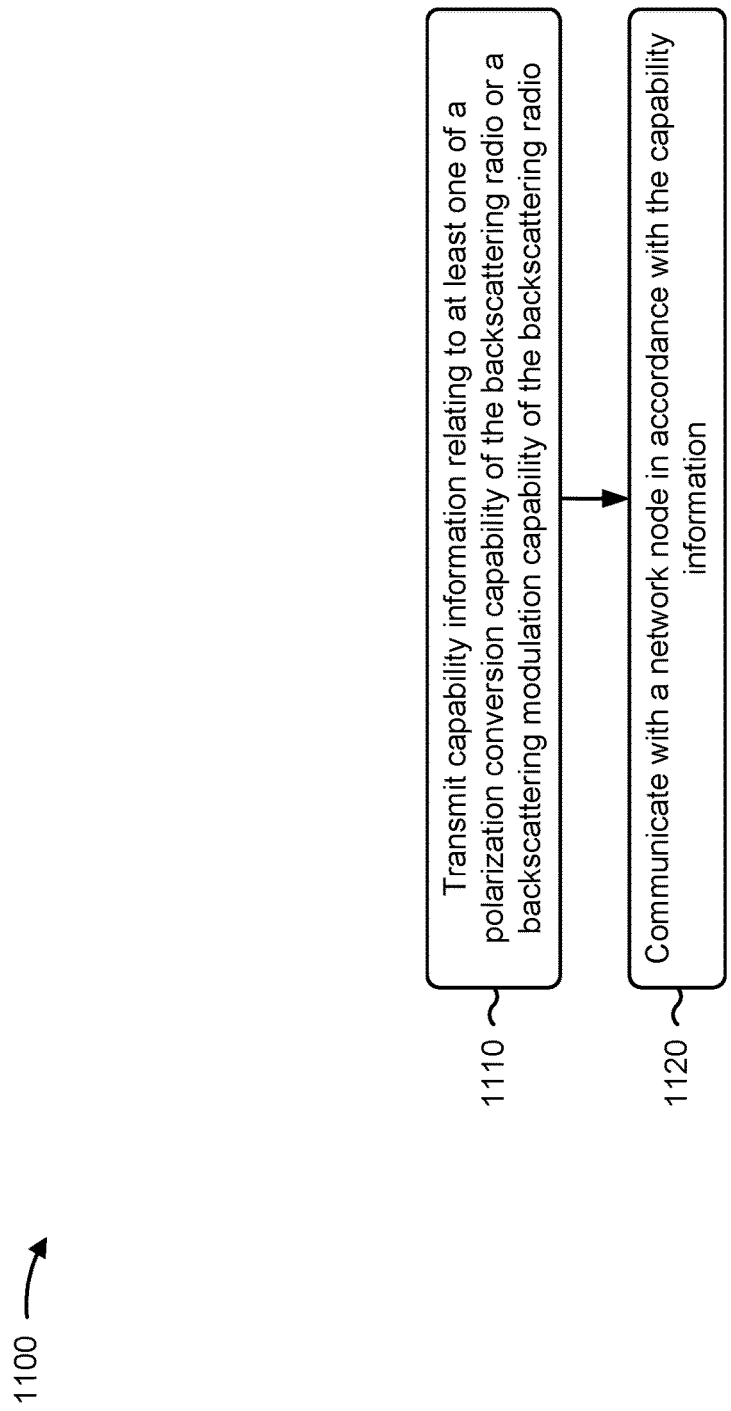
FIG. 11 is a diagram illustrating an example process performed, for example, by a backscattering radio or an apparatus of the backscattering radio, in accordance with the present disclosure.

FIG. 11 is a diagram illustrating an example process 1100 performed, for example, by a backscattering radio or an apparatus of the backscattering radio, in accordance with the present disclosure. Example process 1100 is an example where the backscattering radio (e.g., backscattering radio 405, the backscattering radio of FIGS. 5-10) performs operations associated with polarization conversion or modulation for a backscattering radio.

As shown in FIG. 11, in some aspects, process 1100 may include transmitting capability information relating to at least one of a polarization conversion capability of the backscattering radio or a backscattering modulation capability of the backscattering radio (block 1110). For example, the backscattering radio (e.g., using communication manager 160 and/or transmission component 1404, depicted in FIG. 14) may transmit capability information relating to at least one of a polarization conversion capability of the backscattering radio or a backscattering modulation capability of the backscattering radio, as described above.

As further shown in FIG. 11, in some aspects, process 1100 may include communicating with a network node in accordance with the capability information (block 1120). For example, the backscattering radio (e.g., using communication manager 160 and/or transmission component 1404, depicted in FIG. 14) may communicate with a network node in accordance with the capability information, as described above.

Process 1100 may include additional aspects, such as any single aspect or any combination of aspects described below and/or in connection with one or more other processes described elsewhere herein.

In a first aspect, the transmission of the capability information further comprises transmitting the capability information to a user equipment associated with the backscattering radio.

In a second aspect, alone or in combination with the first aspect, the backscattering modulation capability indicates one or more modulation schemes that the backscattering radio is capable of applying to a backscattered communication.

In a third aspect, alone or in combination with one or more of the first and second aspects, process 1100 includes transmitting the capability information in association with the trigger.

In a fourth aspect, alone or in combination with one or more of the first through third aspects, the communication with the network node in accordance with the capability information further comprises performing a backscattered transmission in accordance with the capability information.

In a fifth aspect, alone or in combination with one or more of the first through fourth aspects, process 1100 includes receiving information indicating a modulation scheme, of one or more modulation schemes indicated by the backscattering modulation capability, wherein the backscattered transmission uses the modulation scheme.

In a sixth aspect, alone or in combination with one or more of the first through fifth aspects, process 1100 includes receiving information indicating a modulation scheme supported by the network node, wherein the backscattered transmission uses the modulation scheme supported by the network node.

In a seventh aspect, alone or in combination with one or more of the first through sixth aspects, process 1100 includes receiving information indicating whether the network node supports polarization conversion at the backscattering radio, wherein the backscattered transmission is based at least in part on whether the network node supports polarization conversion.

In an eighth aspect, alone or in combination with one or more of the first through seventh aspects, process 1100 includes receiving a trigger to activate polarization conversion at the backscattering radio, wherein the backscattered transmission uses polarization conversion based at least in part on the trigger.

In a ninth aspect, alone or in combination with one or more of the first through eighth aspects, performing the backscattered transmission in accordance with the capability information further comprises receiving a first signal, and backscattering the first signal with a converted polarization.

In a tenth aspect, alone or in combination with one or more of the first through ninth aspects, process 1100 includes transmitting an indication of whether polarization conversion or backscattering modulation is activated for the backscattered transmission.

In an eleventh aspect, alone or in combination with one or more of the first through tenth aspects, the capability information indicates a category that identifies at least one of the polarization conversion capability or the backscattering modulation capability.

In a twelfth aspect, alone or in combination with one or more of the first through eleventh aspects, the polarization conversion capability indicates that the backscattering radio can activate and deactivate polarization conversion.

In a thirteenth aspect, alone or in combination with one or more of the first through twelfth aspects, process 1100 includes receiving, prior to transmitting the capability information, configuration information indicating whether the capability information is to include the polarization conversion capability or the backscattering modulation capability.

In a fourteenth aspect, alone or in combination with one or more of the first through thirteenth aspects, the transmission of the capability information further comprises transmitting the capability information using polarization conversion based at least in part on the configuration indicating that the capability information is to include the polarization conversion capability.

In a fifteenth aspect, alone or in combination with one or more of the first through fourteenth aspects, the transmission of the capability information further comprises transmitting the capability information without polarization conversion based at least in part on the configuration indicating that the capability information is not to include the polarization conversion capability.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
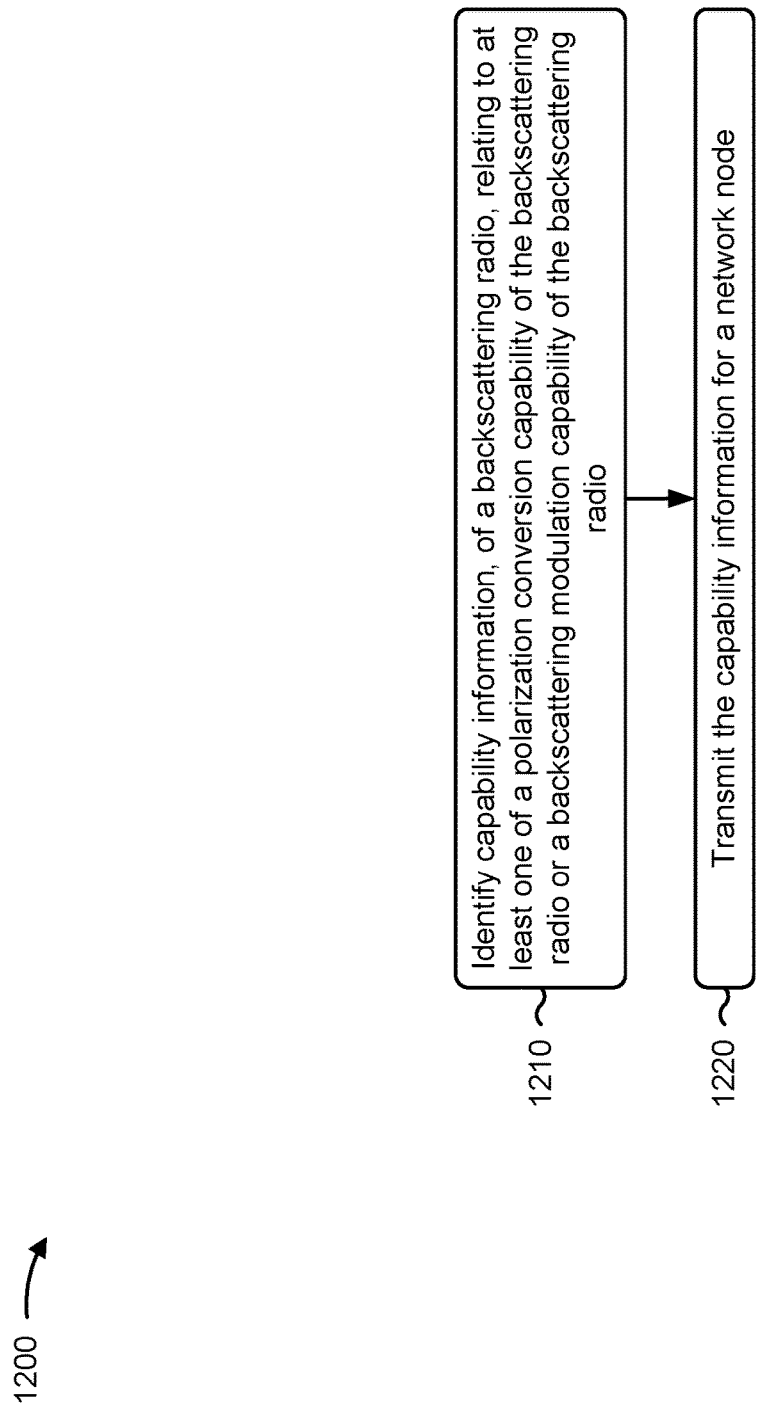
FIG. 12 is a diagram illustrating an example process performed, for example, by a UE, in accordance with the present disclosure.

FIG. 12 is a diagram illustrating an example process 1200 performed, for example, by a UE, in accordance with the present disclosure. Example process 1200 is an example where the UE (e.g., UE 120) performs operations associated with polarization conversion or modulation for a backscattering radio.

As shown in FIG. 12, in some aspects, process 1200 may include identifying capability information, of a backscattering radio, relating to at least one of a polarization conversion capability of the backscattering radio or a backscattering modulation capability of the backscattering radio (block 1210). For example, the UE (e.g., using communication manager 140 and/or capability signaling component 1508, depicted in FIG. 15) may identify capability information, of a backscattering radio, relating to at least one of a polarization conversion capability of the backscattering radio or a backscattering modulation capability of the backscattering radio, as described above.

As further shown in FIG. 12, in some aspects, process 1200 may include transmitting the capability information for a network node (block 1220). For example, the UE (e.g., using communication manager 140 and/or transmission component 1504, depicted in FIG. 15) may transmit the capability information for a network node, as described above.

Process 1200 may include additional aspects, such as any single aspect or any combination of aspects described below and/or in connection with one or more other processes described elsewhere herein.

In a first aspect, the backscattering modulation capability indicates one or more modulation schemes that the backscattering radio is capable of applying to a backscattered communication.

In a second aspect, alone or in combination with the first aspect, process 1200 includes transmitting the capability information in association with the trigger.

In a third aspect, alone or in combination with one or more of the first and second aspects, process 1200 includes receiving information indicating a modulation scheme, of one or more modulation schemes indicated by the backscattering modulation capability, and transmitting the received information to the backscattering radio.

In a fourth aspect, alone or in combination with one or more of the first through third aspects, process 1200 includes receiving information indicating a modulation scheme supported by the network node, and transmitting the received information to the backscattering radio.

In a fifth aspect, alone or in combination with one or more of the first through fourth aspects, process 1200 includes receiving information indicating whether the network node supports polarization conversion at the backscattering radio, and transmitting the received information to the backscattering radio.

In a sixth aspect, alone or in combination with one or more of the first through fifth aspects, process 1200 includes receiving a trigger to activate polarization conversion at the backscattering radio, and transmitting the received information to the backscattering radio.

In a seventh aspect, alone or in combination with one or more of the first through sixth aspects, process 1200 includes transmitting an indication of whether polarization conversion or backscattering modulation is activated for the backscattering radio.

In an eighth aspect, alone or in combination with one or more of the first through seventh aspects, the capability information indicates a category that identifies at least one of the polarization conversion capability or the backscattering modulation capability.

In a ninth aspect, alone or in combination with one or more of the first through eighth aspects, the polarization conversion capability indicates that the backscattering radio can activate and deactivate polarization conversion.

In a tenth aspect, alone or in combination with one or more of the first through ninth aspects, process 1200 includes receiving, prior to transmitting the capability information, configuration information indicating whether the capability information is to include the polarization conversion capability or the backscattering modulation capability.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
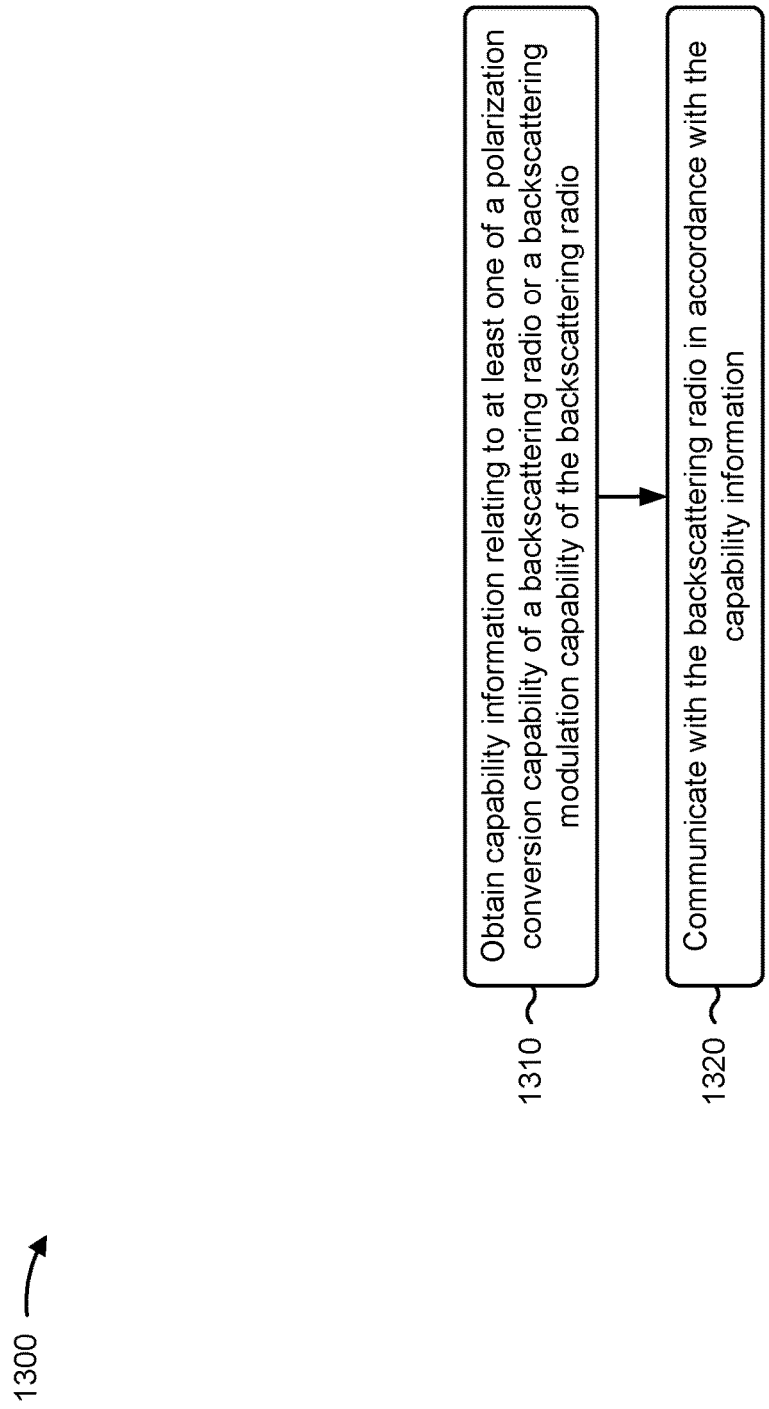
FIG. 13 is a diagram illustrating an example process performed, for example, by a network node, in accordance with the present disclosure.

FIG. 13 is a diagram illustrating an example process 1300 performed, for example, by a network node, in accordance with the present disclosure. Example process 1300 is an example where the network node (e.g., network node 110) performs operations associated with polarization conversion for a backscattering radio.

As shown in FIG. 13, in some aspects, process 1300 may include obtaining capability information relating to at least one of a polarization conversion capability of a backscattering radio or a backscattering modulation capability of the backscattering radio (block 1310). For example, the network node (e.g., using communication manager 150 and/or reception component 1602, depicted in FIG. 16) may obtain capability information relating to at least one of a polarization conversion capability of a backscattering radio or a backscattering modulation capability of the backscattering radio, as described above.

As further shown in FIG. 13, in some aspects, process 1300 may include communicating with the backscattering radio in accordance with the capability information (block 1320). For example, the network node (e.g., using communication manager 150 and/or transmission component 1604, depicted in FIG. 16) may communicate with the backscattering radio in accordance with the capability information, as described above.

Process 1300 may include additional aspects, such as any single aspect or any combination of aspects described below and/or in connection with one or more other processes described elsewhere herein.

In a first aspect, obtaining the capability information further comprises obtaining the capability information from a user equipment associated with the backscattering radio.

In a second aspect, alone or in combination with the first aspect, the backscattering modulation capability indicates one or more modulation schemes that the backscattering radio is capable of applying to a backscattered communication.

In a third aspect, alone or in combination with one or more of the first and second aspects, process 1300 includes outputting a trigger for transmitting the capability information.

In a fourth aspect, alone or in combination with one or more of the first through third aspects, the communication with the backscattering radio in accordance with the capability information further comprises receiving or scheduling a backscattered transmission in accordance with the capability information.

In a fifth aspect, alone or in combination with one or more of the first through fourth aspects, process 1300 includes outputting information indicating a modulation scheme, of one or more modulation schemes indicated by the backscattering modulation capability, wherein the backscattered transmission uses the modulation scheme.

In a sixth aspect, alone or in combination with one or more of the first through fifth aspects, process 1300 includes outputting information indicating a modulation scheme supported by the network node, wherein the backscattered transmission uses the modulation scheme supported by the network node.

In a seventh aspect, alone or in combination with one or more of the first through sixth aspects, process 1300 includes outputting information indicating whether the network node supports polarization conversion at the backscattering radio, wherein the backscattered transmission is based at least in part on whether the network node supports polarization conversion.

In an eighth aspect, alone or in combination with one or more of the first through seventh aspects, process 1300 includes outputting a trigger to activate polarization conversion at the backscattering radio, wherein the backscattered transmission uses polarization conversion based at least in part on the trigger.

In a ninth aspect, alone or in combination with one or more of the first through eighth aspects, process 1300 includes transmitting an indication of whether polarization conversion or backscattering modulation is activated for the backscattered transmission.

In a tenth aspect, alone or in combination with one or more of the first through ninth aspects, the capability information indicates a category that identifies at least one of the polarization conversion capability or the backscattering modulation capability.

In an eleventh aspect, alone or in combination with one or more of the first through tenth aspects, the polarization conversion capability indicates that the backscattering radio can activate and deactivate polarization conversion.

In a twelfth aspect, alone or in combination with one or more of the first through eleventh aspects, process 1300 includes outputting, prior to transmitting the capability information, configuration information indicating whether the capability information is to include the polarization conversion capability or the backscattering modulation capability.

In a thirteenth aspect, alone or in combination with one or more of the first through twelfth aspects, obtaining the capability information further comprises monitoring for the capability information using a first hypothesis with polarization conversion and a second hypothesis without polarization conversion based at least in part on the configuration indicating that the capability information is to include the polarization conversion capability.

In a fourteenth aspect, alone or in combination with one or more of the first through thirteenth aspects, obtaining the capability information further comprises monitoring for the capability information without polarization conversion based at least in part on the configuration indicating that the capability information is not to include the polarization conversion capability.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
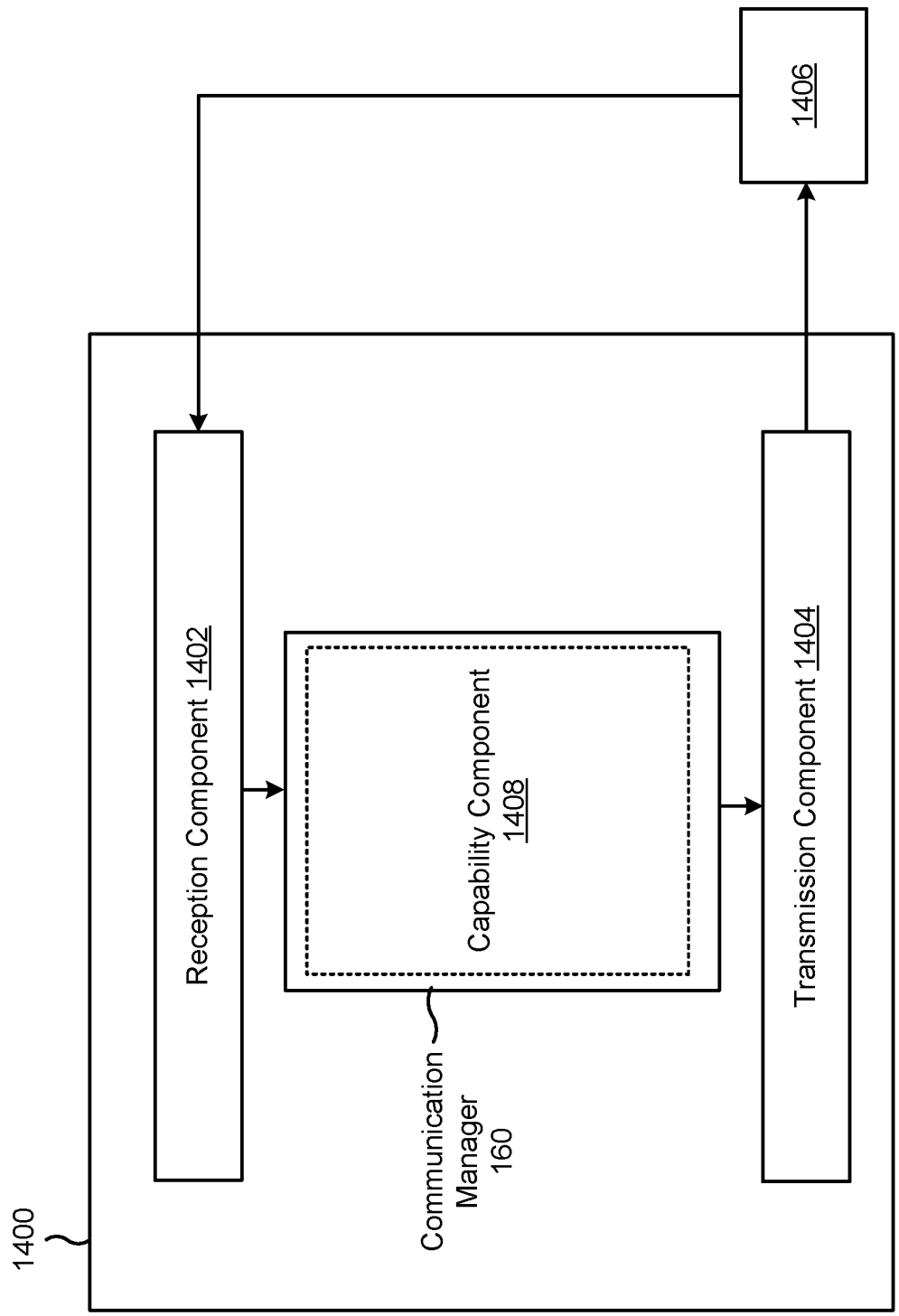
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a backscattering radio, or a backscattering radio may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 160. The communication manager 160 may include one or more of a capability signaling component 1408, among other examples.

In some aspects, the apparatus 1400 may be configured to perform one or more operations described herein in connection with FIGS. 3-10. Additionally, or alternatively, the apparatus 1400 may be configured to perform one or more processes described herein, such as process 1100 of FIG. 11, or a combination thereof. In some aspects, the apparatus 1400 and/or one or more components shown in FIG. 14 may include one or more components of the backscattering radio described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the backscattering radio described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the backscattering radio described in connection with FIG. 2. In some aspects, the transmission component 1404 may be co-located with the reception component 1402 in a transceiver.

The transmission component 1404 or the capability signaling component 1408 may transmit capability information relating to at least one of a polarization conversion capability of the backscattering radio or a backscattering modulation capability of the backscattering radio. The transmission component 1404 may communicate with a network node in accordance with the capability information.

The transmission component 1404 may transmit the capability information in association with the trigger.

The reception component 1402 may receive information indicating a modulation scheme, of one or more modulation schemes indicated by the backscattering modulation capability, wherein the backscattered transmission uses the modulation scheme.

The reception component 1402 may receive information indicating a modulation scheme supported by the network node, wherein the backscattered transmission uses the modulation scheme supported by the network node.

The reception component 1402 may receive information indicating whether the network node supports polarization conversion at the backscattering radio, wherein the backscattered transmission is based at least in part on whether the network node supports polarization conversion.

The reception component 1402 may receive a trigger to activate polarization conversion at the backscattering radio, wherein the backscattered transmission uses polarization conversion based at least in part on the trigger.

The transmission component 1404 may transmit an indication of whether polarization conversion or backscattering modulation is activated for the backscattered transmission.

The reception component 1402 may receive, prior to transmitting the capability information, configuration information indicating whether the capability information is to include the polarization conversion capability or the backscattering modulation capability.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
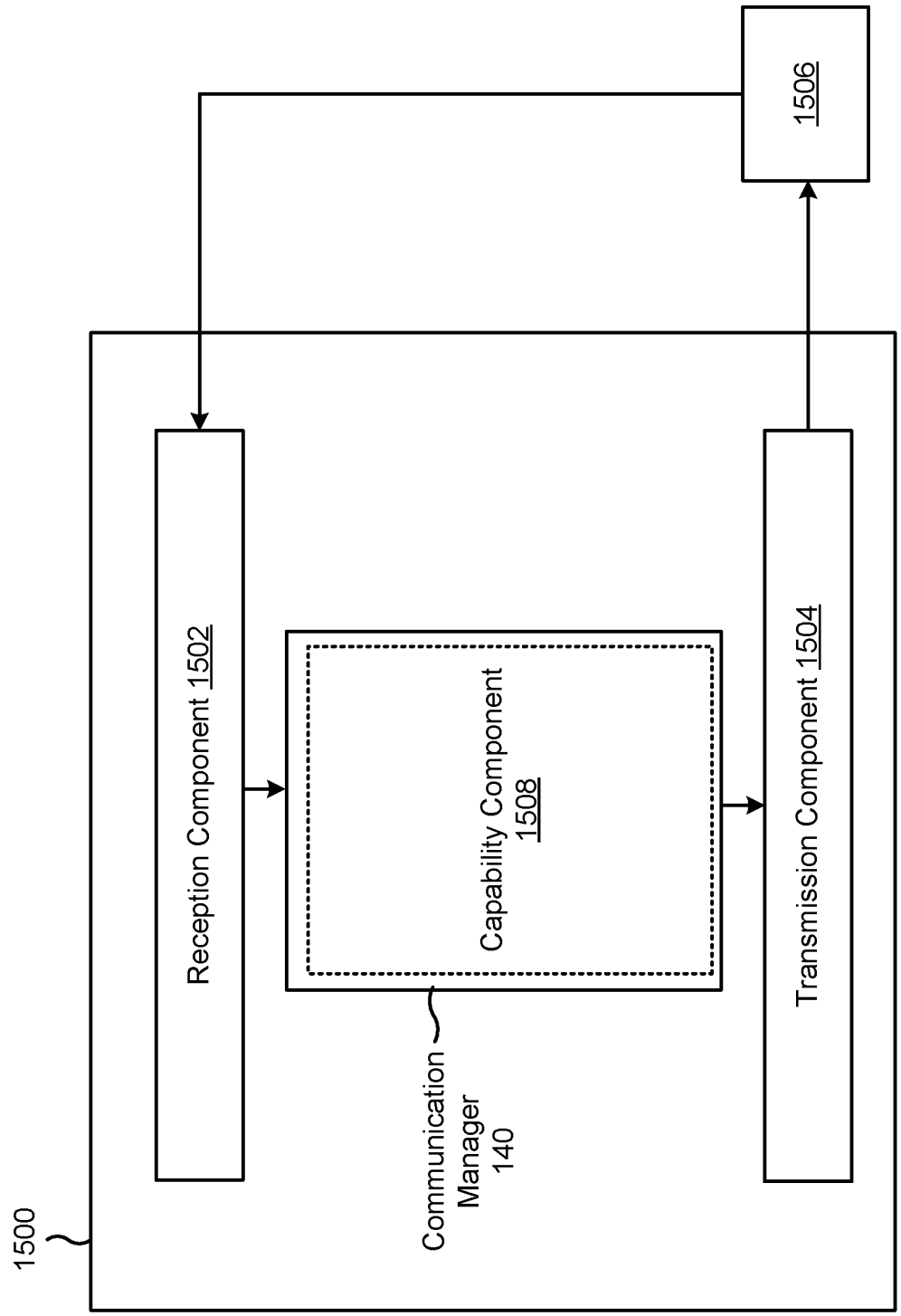
FIG. 15 is a diagram of an example apparatus for wireless communication, in accordance with the present disclosure.

FIG. 15 is a diagram of an example apparatus 1500 for wireless communication, in accordance with the present disclosure. The apparatus 1500 may be a UE, or a UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 140. The communication manager 140 may include a capability signaling component 1508, among other examples.

In some aspects, the apparatus 1500 may be configured to perform one or more operations described herein in connection with FIGS. 4-10. Additionally, or alternatively, the apparatus 1500 may be configured to perform one or more processes described herein, such as process 1200 of FIG. 12, or a combination thereof. In some aspects, the apparatus 1500 and/or one or more components shown in FIG. 15 may include one or more components of the UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the UE described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the UE described in connection with FIG. 2. In some aspects, the transmission component 1504 may be co-located with the reception component 1502 in a transceiver.

The capability signaling component 1508 may identify capability information, of a backscattering radio, relating to at least one of a polarization conversion capability of the backscattering radio or a backscattering modulation capability of the backscattering radio. The transmission component 1504 may transmit the capability information for a network node.

The transmission component 1504 may transmit the capability information in association with the trigger.

The reception component 1502 may receive information indicating a modulation scheme, of one or more modulation schemes indicated by the backscattering modulation capability transmitting the received information to the backscattering radio.

The reception component 1502 may receive information indicating a modulation scheme supported by the network node.

The transmission component 1504 may transmit the received information to the backscattering radio.

The reception component 1502 may receive information indicating whether the network node supports polarization conversion at the backscattering radio.

The transmission component 1504 may transmit the received information to the backscattering radio.

The reception component 1502 may receive a trigger to activate polarization conversion at the backscattering radio.

The transmission component 1504 may transmit the received information to the backscattering radio.

The transmission component 1504 may transmit an indication of whether polarization conversion or backscattering modulation is activated for the backscattering radio.

The reception component 1502 may receive, prior to transmitting the capability information, configuration information indicating whether the capability information is to include the polarization conversion capability or the backscattering modulation capability.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
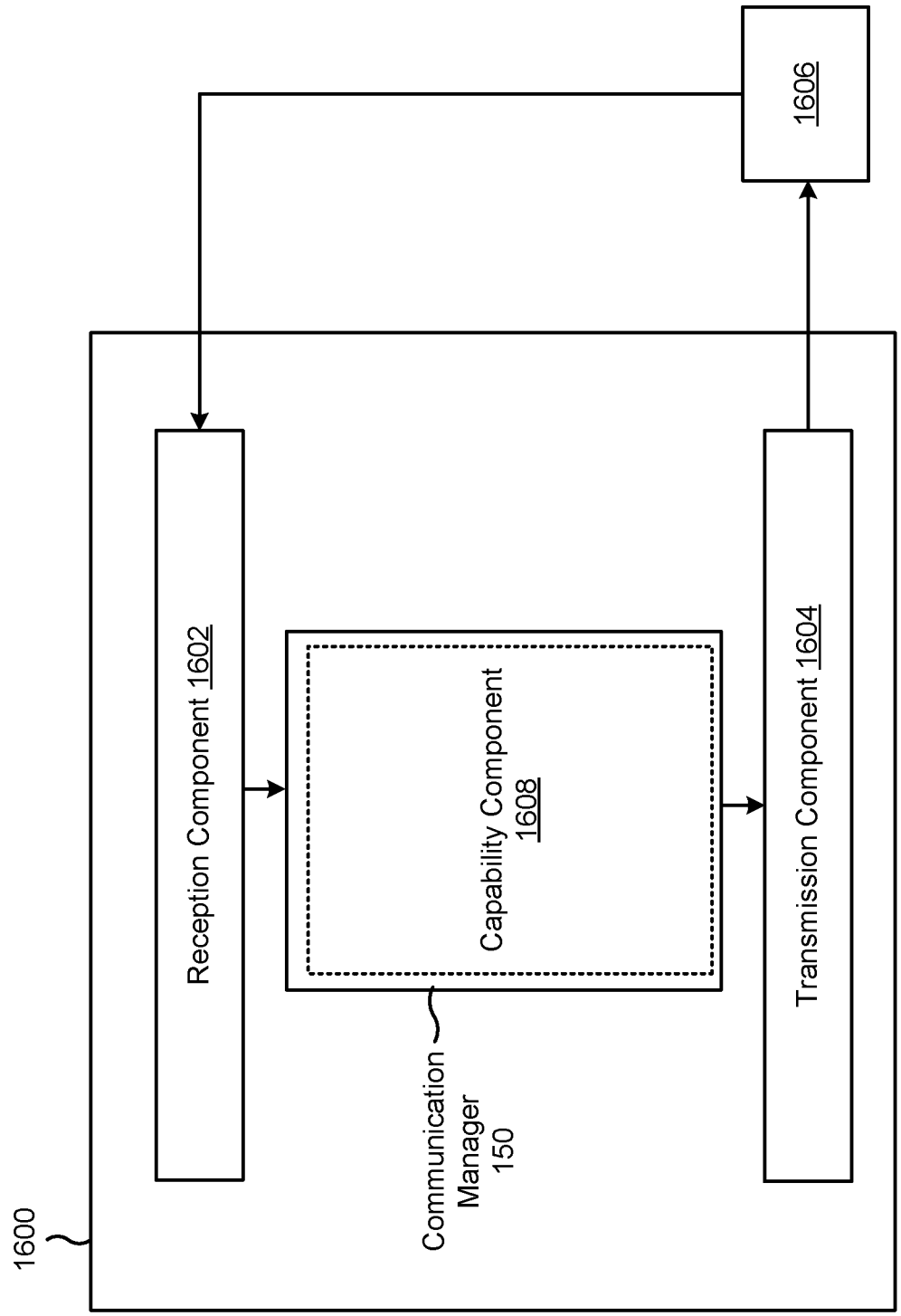
FIG. 16 is a diagram of an example apparatus for wireless communication, in accordance with the present disclosure.

FIG. 16 is a diagram of an example apparatus 1600 for wireless communication, in accordance with the present disclosure. The apparatus 1600 may be a network node, or a network node may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 150. The communication manager 150 may include a capability signaling component 1608, among other examples.

In some aspects, the apparatus 1600 may be configured to perform one or more operations described herein in connection with FIGS. 4-10. Additionally, or alternatively, the apparatus 1600 may be configured to perform one or more processes described herein, such as process 1200 of FIG. 12, or a combination thereof. In some aspects, the apparatus 1600 and/or one or more components shown in FIG. 16 may include one or more components of the network node described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the network node described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the network node described in connection with FIG. 2. In some aspects, the transmission component 1604 may be co-located with the reception component 1602 in a transceiver.

The capability signaling component 1608 may obtain capability information relating to at least one of a polarization conversion capability of a backscattering radio or a backscattering modulation capability of the backscattering radio. The transmission component 1604 may communicate with the backscattering radio in accordance with the capability information.

The transmission component 1604 may output a trigger for transmitting the capability information.

The transmission component 1604 may output information indicating a modulation scheme, of one or more modulation schemes indicated by the backscattering modulation capability, wherein the backscattered transmission uses the modulation scheme.

The transmission component 1604 may output information indicating a modulation scheme supported by the network node, wherein the backscattered transmission uses the modulation scheme supported by the network node.

The transmission component 1604 may output information indicating whether the network node supports polarization conversion at the backscattering radio, wherein the backscattered transmission is based at least in part on whether the network node supports polarization conversion.

The transmission component 1604 may output a trigger to activate polarization conversion at the backscattering radio, wherein the backscattered transmission uses polarization conversion based at least in part on the trigger.

The transmission component 1604 may transmit an indication of whether polarization conversion or backscattering modulation is activated for the backscattered transmission.

The transmission component 1604 may output, prior to transmitting the capability information, configuration information indicating whether the capability information is to include the polarization conversion capability or the backscattering modulation capability.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by an apparatus of a backscattering radio, comprising: transmitting capability information relating to at least one of a polarization conversion capability of the backscattering radio or a backscattering modulation capability of the backscattering radio; and communicating with a network node in accordance with the capability information.

Aspect 2: The method of Aspect 1, wherein the transmission of the capability information further comprises transmitting the capability information to a user equipment associated with the backscattering radio.

Aspect 3: The method of any of Aspects 1-2, wherein the backscattering modulation capability indicates one or more modulation schemes that the backscattering radio is capable of applying to a backscattered communication.

Aspect 4: The method of any of Aspects 1-3, further comprising receiving a trigger for transmitting the capability information, wherein transmitting the capability information further comprises transmitting the capability information in association with the trigger.

Aspect 5: The method of any of Aspects 1-4, wherein the communication with the network node in accordance with the capability information further comprises performing a backscattered transmission in accordance with the capability information.

Aspect 6: The method of Aspect 5, further comprising receiving information indicating a modulation scheme, of one or more modulation schemes indicated by the backscattering modulation capability, wherein the backscattered transmission uses the modulation scheme.

Aspect 7: The method of Aspect 5, further comprising receiving information indicating a modulation scheme supported by the network node, wherein the backscattered transmission uses the modulation scheme supported by the network node.

Aspect 8: The method of Aspect 5, further comprising receiving information indicating whether the network node supports polarization conversion at the backscattering radio, wherein the backscattered transmission is based at least in part on whether the network node supports polarization conversion.

Aspect 9: The method of Aspect 5, further comprising receiving a trigger to activate polarization conversion at the backscattering radio, wherein the backscattered transmission uses polarization conversion based at least in part on the trigger.

Aspect 10: The method of Aspect 9, wherein performing the backscattered transmission in accordance with the capability information further comprises: receiving a first signal; and backscattering the first signal with a converted polarization.

Aspect 11: The method of Aspect 5, further comprising transmitting an indication of whether polarization conversion or backscattering modulation is activated for the backscattered transmission.

Aspect 12: The method of any of Aspects 1-11, wherein the capability information indicates a category that identifies at least one of the polarization conversion capability or the backscattering modulation capability.

Aspect 13: The method of any of Aspects 1-12, wherein the polarization conversion capability indicates that the backscattering radio can activate and deactivate polarization conversion.

Aspect 14: The method of any of Aspects 1-13, further comprising receiving, prior to transmitting the capability information, configuration information indicating whether the capability information is to include the polarization conversion capability or the backscattering modulation capability.

Aspect 15: The method of Aspect 14, wherein the transmission of the capability information further comprises transmitting the capability information using polarization conversion based at least in part on the configuration indicating that the capability information is to include the polarization conversion capability.

Aspect 16: The method of Aspect 14, wherein the transmission of the capability information further comprises transmitting the capability information without polarization conversion based at least in part on the configuration indicating that the capability information is not to include the polarization conversion capability.

Aspect 17: A method of wireless communication performed by a user equipment (UE), comprising: identifying capability information, of a backscattering radio, relating to at least one of a polarization conversion capability of the backscattering radio or a backscattering modulation capability of the backscattering radio; and transmitting the capability information for a network node.

Aspect 18: The method of Aspect 17, wherein the backscattering modulation capability indicates one or more modulation schemes that the backscattering radio is capable of applying to a backscattered communication.

Aspect 19: The method of any of Aspects 17-18, further comprising receiving a trigger for transmitting the capability information, wherein transmitting the capability information further comprises transmitting the capability information in association with the trigger.

Aspect 20: The method of any of Aspects 17-19, further comprising receiving information indicating a modulation scheme, of one or more modulation schemes indicated by the backscattering modulation capability; and transmitting the received information to the backscattering radio.

Aspect 21: The method of any of Aspects 17-20, further comprising: receiving information indicating a modulation scheme supported by the network node; and transmitting the received information to the backscattering radio.

Aspect 22: The method of any of Aspects 17-21, further comprising: receiving information indicating whether the network node supports polarization conversion at the backscattering radio; and transmitting the received information to the backscattering radio.

Aspect 23: The method of any of Aspects 17-22, further comprising: receiving a trigger to activate polarization conversion at the backscattering radio; and transmitting the received information to the backscattering radio.

Aspect 24: The method of any of Aspects 17-23, further comprising transmitting an indication of whether polarization conversion or backscattering modulation is activated for the backscattering radio.

Aspect 25: The method of any of Aspects 17-24, wherein the capability information indicates a category that identifies at least one of the polarization conversion capability or the backscattering modulation capability.

Aspect 26: The method of any of Aspects 17-25, wherein the polarization conversion capability indicates that the backscattering radio can activate and deactivate polarization conversion.

Aspect 27: The method of any of Aspects 17-26, further comprising receiving, prior to transmitting the capability information, configuration information indicating whether the capability information is to include the polarization conversion capability or the backscattering modulation capability.

Aspect 28: A method of wireless communication performed by a network node, comprising: obtaining capability information relating to at least one of a polarization conversion capability of a backscattering radio or a backscattering modulation capability of the backscattering radio; and communicating with the backscattering radio in accordance with the capability information.

Aspect 29: The method of Aspect 28, wherein obtaining the capability information further comprises obtaining the capability information from a user equipment associated with the backscattering radio.

Aspect 30: The method of any of Aspects 28-29, wherein the backscattering modulation capability indicates one or more modulation schemes that the backscattering radio is capable of applying to a backscattered communication.

Aspect 31: The method of any of Aspects 28-30, further comprising outputting a trigger for transmitting the capability information.

Aspect 32: The method of any of Aspects 28-31, wherein the communication with the backscattering radio in accordance with the capability information further comprises receiving or scheduling a backscattered transmission in accordance with the capability information.

Aspect 33: The method of Aspect 32, further comprising outputting information indicating a modulation scheme, of one or more modulation schemes indicated by the backscattering modulation capability, wherein the backscattered transmission uses the modulation scheme.

Aspect 34: The method of Aspect 32, further comprising outputting information indicating a modulation scheme supported by the network node, wherein the backscattered transmission uses the modulation scheme supported by the network node.

Aspect 35: The method of Aspect 32, further comprising outputting information indicating whether the network node supports polarization conversion at the backscattering radio, wherein the backscattered transmission is based at least in part on whether the network node supports polarization conversion.

Aspect 36: The method of Aspect 32, further comprising outputting a trigger to activate polarization conversion at the backscattering radio, wherein the backscattered transmission uses polarization conversion based at least in part on the trigger.

Aspect 37: The method of Aspect 32, further comprising transmitting an indication of whether polarization conversion or backscattering modulation is activated for the backscattered transmission.

Aspect 38: The method of any of Aspects 28-37, wherein the capability information indicates a category that identifies at least one of the polarization conversion capability or the backscattering modulation capability.

Aspect 39: The method of any of Aspects 28-38, wherein the polarization conversion capability indicates that the backscattering radio can activate and deactivate polarization conversion.

Aspect 40: The method of any of Aspects 28-39, further comprising outputting, prior to transmitting the capability information, configuration information indicating whether the capability information is to include the polarization conversion capability or the backscattering modulation capability.

Aspect 41: The method of Aspect 40, wherein obtaining the capability information further comprises monitoring for the capability information using a first hypothesis with polarization conversion and a second hypothesis without polarization conversion based at least in part on the configuration indicating that the capability information is to include the polarization conversion capability.

Aspect 42: The method of Aspect 40, wherein obtaining the capability information further comprises monitoring for the capability information without polarization conversion based at least in part on the configuration indicating that the capability information is not to include the polarization conversion capability.

Aspect 43: An apparatus for wireless communication at a device, comprising a processor; memory coupled with the processor; and instructions stored in the memory and executable by the processor to cause the apparatus to perform the method of one or more of Aspects 1-42.

Aspect 44: A device for wireless communication, comprising a memory and one or more processors coupled to the memory, the one or more processors configured to perform the method of one or more of Aspects 1-42.

Aspect 45: An apparatus for wireless communication, comprising at least one means for performing the method of one or more of Aspects 1-42.

Aspect 46: A non-transitory computer-readable medium storing code for wireless communication, the code comprising instructions executable by a processor to perform the method of one or more of Aspects 1-42.

Aspect 47: A non-transitory computer-readable medium storing a set of instructions for wireless communication, the set of instructions comprising one or more instructions that, when executed by one or more processors of a device, cause the device to perform the method of one or more of Aspects 1-42.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not backscatter the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A radio frequency identifier (RFID) tag for wireless communication, comprising:
one or more memories; and
one or more processors, coupled to the one or more memories, configured to:
transmit capability information relating to at least one of a polarization conversion capability of the RFID tag or a backscattering modulation capability of the RFID tag; and
communicate with a network node in accordance with the capability information.

2. The RFID tag of claim 1, wherein the one or more processors, to transmit the capability information, are configured to transmit the capability information to a user equipment (UE) associated with the RFID tag.

3. The RFID tag of claim 1, wherein the backscattering modulation capability indicates one or more modulation schemes that the RFID tag is capable of applying to a backscattered communication.

4. The RFID tag of claim 1, wherein the one or more processors are further configured to receive a trigger for transmitting the capability information, wherein the one or more processors, to transmit the capability information, are further configured to transmit the capability information in association with the trigger.

5. The RFID tag of claim 1, wherein the one or more processors, to communicate with the network node in accordance with the capability information, are configured to perform a backscattered transmission in accordance with the capability information.

6. The RFID tag of claim 5, wherein the one or more processors are further configured to receive information indicating a modulation scheme, of one or more modulation schemes indicated by the backscattering modulation capability, wherein the backscattered transmission uses the modulation scheme.

7. The RFID tag of claim 5, wherein the one or more processors are further configured to receive information indicating a modulation scheme supported by the network node, wherein the backscattered transmission uses the modulation scheme supported by the network node.

8. The RFID tag of claim 5, wherein the one or more processors are further configured to receive information indicating whether the network node supports polarization conversion at the RFID tag, wherein the backscattered transmission is based at least in part on whether the network node supports the polarization conversion.

9. The RFID tag of claim 5, wherein the one or more processors are further configured to receive a trigger to activate polarization conversion at the RFID tag, wherein the backscattered transmission uses the polarization conversion based at least in part on the trigger.

10. The RFID tag of claim 9, wherein the one or more processors, to perform the backscattered transmission in accordance with the capability information, are configured to:
receive a first signal; and
backscatter the first signal with a converted polarization.

11. The RFID tag of claim 5, wherein the one or more processors are further configured to transmit an indication of whether polarization conversion or backscattering modulation is activated for the backscattered transmission.

12. The RFID tag of claim 1, wherein the capability information indicates a category that identifies at least one of the polarization conversion capability or the backscattering modulation capability.

13. The RFID tag of claim 1, wherein the polarization conversion capability indicates that the RFID tag can activate and deactivate polarization conversion.

14. The RFID tag of claim 1, wherein the one or more processors are further configured to receive, prior to transmitting the capability information, configuration information indicating whether the capability information is to include the polarization conversion capability or the backscattering modulation capability.

15. The RFID tag of claim 1, wherein the RFID tag comprises a passive RFID tag or a semi-passive RFID tag.

16. A user equipment (UE) for wireless communication, comprising:
one or more memories; and
one or more processors, coupled to the memory one or more memories, configured to:
identify capability information, of a radio frequency identifier (RFID) tag, relating to at least one of a polarization conversion capability of the RFID tag or a backscattering modulation capability of the RFID tag; and
transmit the capability information to a network node.

17. The UE of claim 16, wherein the one or more processors are further configured to receive a trigger for transmitting the capability information, wherein the one or more processors, to transmit the capability information, are further configured to transmit the capability information in association with the trigger.

18. The UE of claim 16, wherein the one or more processors are further configured to transmit an indication of whether polarization conversion or backscattering modulation is activated for the RFID tag.

19. The UE of claim 16, wherein the polarization conversion capability indicates that the RFID tag can activate and deactivate polarization conversion.

20. The UE of claim 16, wherein the one or more processors are further configured to receive, prior to transmitting the capability information, configuration information indicating whether the capability information is to include the polarization conversion capability or the backscattering modulation capability.

21. A network node for wireless communication, comprising:
one or more memories; and
one or more processors, coupled to the one or more memories, configured to:
obtain capability information relating to at least one of a polarization conversion capability of a radio frequency identifier (RFID) tag or a backscattering modulation capability of the RFID tag; and
communicate with the backseattering radie RFID tag in accordance with the capability information.

22. The network node of claim 21, wherein the one or more processors, to obtain the capability information, are configured to obtain the capability information from a user equipment (UE) associated with the RFID tag.

23. The network node of claim 21, wherein the backscattering modulation capability indicates one or more modulation schemes that the RFID tag is capable of applying to a backscattered communication.

24. The network node of claim 21, wherein the one or more processors are further configured to output a trigger for transmitting the capability information.

25. The network node of claim 21, wherein the one or more processors, to communicate with the RFID tag in accordance with the capability information, are configured to receive or schedule a backscattered transmission in accordance with the capability information.

26. The network node of claim 25, wherein the one or more processors are further configured to output, prior to transmitting the capability information, configuration information indicating whether the capability information is to include the polarization conversion capability or the backscattering modulation capability.

27. The network node of claim 26, wherein the one or more processors, to obtain the capability information, are configured to monitor for the capability information using a first hypothesis with polarization conversion and a second hypothesis without the polarization conversion based at least in part on the configuration information indicating that the capability information is to include the polarization conversion capability.

28. The network node of claim 26, wherein the one or more processors, to obtain the capability information, are configured to monitor for the capability information without polarization conversion based at least in part on the configuration information indicating that the capability information is not to include the polarization conversion capability.

29. A method of wireless communication performed by an apparatus of a radio frequency identifier (RFID) tag, comprising:
    transmitting capability information relating to at least one of a polarization conversion capability of the RFID tag or a backscattering modulation capability of the RFID tag; and
    communicating with a network node in accordance with the capability information.

30. The method of claim 29, wherein the transmission of the capability information further comprises transmitting the capability information to a user equipment (UE) associated with the RFID tag.

* * * * *